United States Patent
Alameh et al.

(10) Patent No.: US 10,616,343 B1
(45) Date of Patent: Apr. 7, 2020

(54) CENTER CONSOLE UNIT AND CORRESPONDING SYSTEMS AND METHODS

(71) Applicant: Motorola Mobility LLC, Chicago, IL (US)

(72) Inventors: Rachid Alameh, Crystal Lake, IL (US); Zhengping Ji, Hinsdale, IL (US); Michael Russell, Lake Zurich, IL (US); Thomas Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 6 days.

(21) Appl. No.: 16/167,287

(22) Filed: Oct. 22, 2018

(51) Int. Cl.
| G06F 3/0488 | (2013.01) |
| H04L 29/08 | (2006.01) |
| G06F 21/31 | (2013.01) |
| G06N 20/00 | (2019.01) |
| G06F 16/9535 | (2019.01) |
| H04W 4/70 | (2018.01) |
| H04W 4/02 | (2018.01) |

(52) U.S. Cl.
CPC ........ H04L 67/125 (2013.01); G06F 16/9535 (2019.01); G06F 21/316 (2013.01); G06N 20/00 (2019.01); H04W 4/023 (2013.01); H04W 4/70 (2018.02)

(58) Field of Classification Search
CPC ............. G06F 16/2423; G06F 16/2457; G06F 16/24578; G06F 3/0484; H04L 67/12; H04L 41/22; H04L 12/2816; H04W 4/70; H04W 84/18; H04W 4/80; H04W 4/023; G06N 20/00

See application file for complete search history.

(56) References Cited

U.S. PATENT DOCUMENTS

| 2017/0006454 | A1 | 1/2017 | Salkintzis |
| 2017/0199721 | A1 | 7/2017 | Ivanov et al. |
| 2018/0034913 | A1* | 2/2018 | Matthieu ............... H04L 67/125 |
| 2018/0189679 | A1 | 7/2018 | Kang et al. |
| 2018/0341400 | A1* | 11/2018 | Kim .................... G06F 3/04847 |
| 2019/0104119 | A1* | 4/2019 | Giorgi .............. H04W 12/0609 |
| 2019/0244129 | A1* | 8/2019 | Tabuchi ................. G06N 20/00 |
| 2019/0332814 | A1* | 10/2019 | Bos ........................ G06N 20/00 |

OTHER PUBLICATIONS

Routray, Sangram et al., "A Study Wireless Communication Domain", Ineternational Journal of Instrumentation, Control & Automation; vol. 1, Issue 1, 2011.

* cited by examiner

Primary Examiner — Chirag R Patel
(74) Attorney, Agent, or Firm — Philip H. Burrus, IV

(57) ABSTRACT

A central console unit includes a communication device and one or more processors. The communication device is in communication with one or more Internet-of-things devices. An artificial intelligence engine receives inputs from the Internet-of-things devices and transforms the inputs into machine-learned knowledge stored in an Internet-of-things knowledge domain. The central console unit detects at least one mobile device having other machine learned knowledge about an authorized user of the mobile device in a user knowledge domain, stored in the at least one mobile device, communicating with the communication device. When this occurs, the central console unit causes the at least one mobile device to deliver an exchange data.

20 Claims, 12 Drawing Sheets

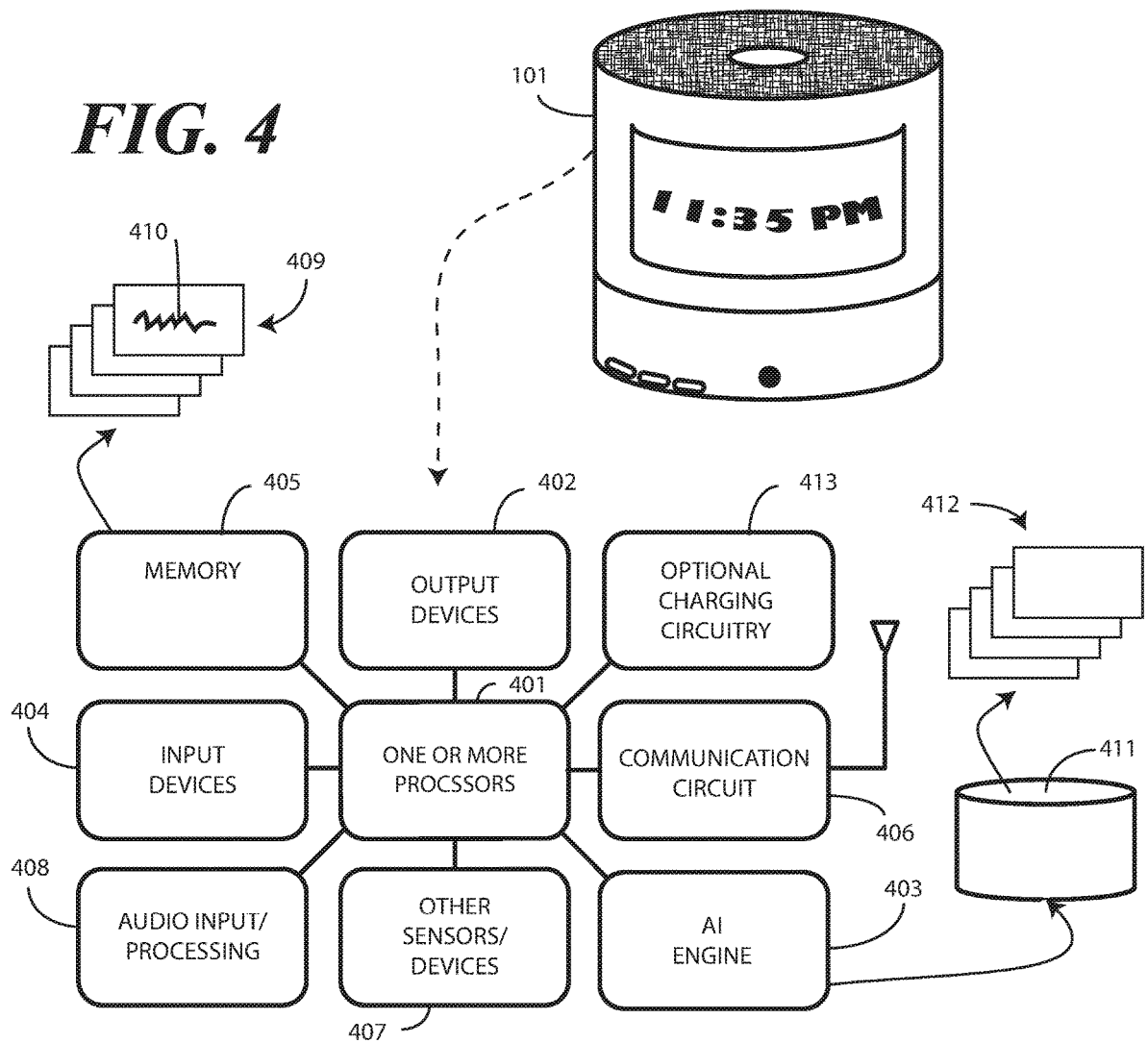

CENTER CONSOLE UNIT AND CORRESPONDING SYSTEMS AND METHODS

BACKGROUND

Technical Field

This disclosure relates generally to electronic devices, and more particularly to electronic devices having data communication capabilities.

Background Art

As electronic devices have become more advanced, so too have their user interfaces. Using a computer as an example, traditionally mechanical devices such as a keyboard and a mouse were used to deliver data to, and control, the computer. However, advances in hardware now allow users to deliver information using systems such as touch-sensitive displays, voice commands, and styluses.

As these systems evolve, users expect interaction with such devices to continually become more seamless. Moreover, users expect an increasing number of services to be provided by these machines. It would be advantageous to have an improved device able to satisfy both expectations.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 4 illustrates one explanatory central console unit in accordance with one or more embodiments of the disclosure.

FIG. 5 illustrates one or more explanatory controllable devices in accordance with one or more embodiments of the disclosure.

Figure 1:
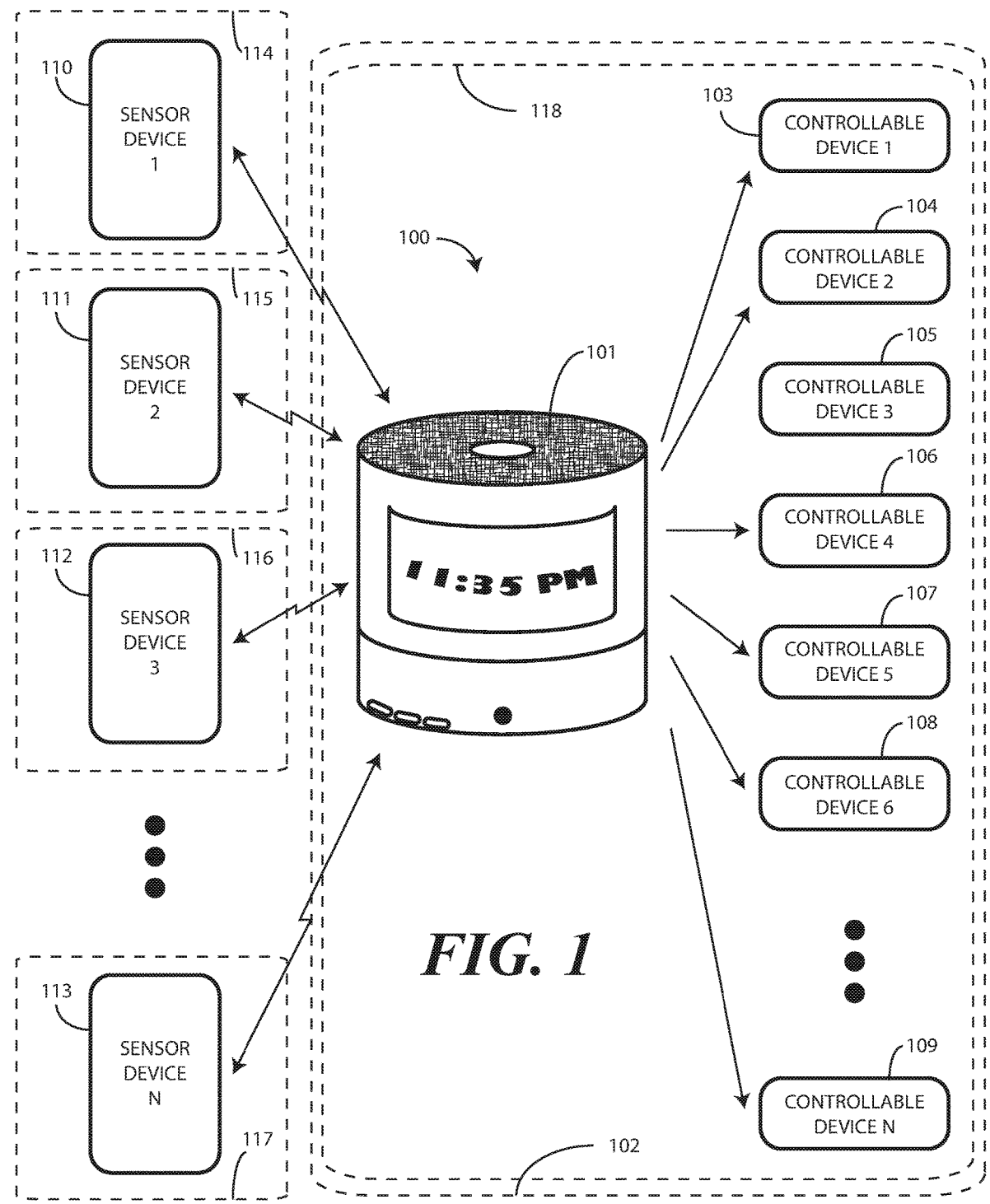
FIG. 1 illustrates on explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using a central console unit comprising an artificial intelligence engine receiving inputs and control settings from the one or more Internet-of-things devices and transforming the inputs and the control settings into machine learned knowledge stored in an Internet-of-things knowledge domain as an electronic liaison between one or more mobile devices having their own machine learned knowledge about an authorized user of the mobile devices stored in a user knowledge domain separate from the Internet-of-things knowledge domain and at least one Internet-of-things device that is controllable by the central console unit. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of employing a central console unit as an electronic interface between at least one mobile device and at least one Internet-of-things device as described herein. The non-processor circuits may include, but are not limited to, a radio receiver, a radio transmitter, signal drivers, clock circuits, power source circuits, and user input devices. As such, these functions may be interpreted as steps of a method to perform, for example, the electronic delivery and receipt of exchange data dossiers to and from the mobile devices, and performing control operations responsive thereto to alter the behavior of an Internet-of-things device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a central console unit that includes a communication device, which can communicate via one or more of wired or wireless communication techniques. In one or more embodiments, the communication device of the central console unit communicates with one or more Internet-of-things devices that are operating within a predefined area, such as a home, about the central console unit.

In one or more embodiments, the central console unit also includes a memory and an Artificial Intelligence (AI) engine. The AI engine receives inputs and/or control settings from the one or more Internet-of-things devices and transforms the inputs and control settings into machine learned knowledge stored in an Internet-of-things knowledge domain of the memory. In one or more embodiments, one or more processors of the central console unit can perform a control operation to alter a behavior of at least one Internet-of-things device. For example, if the Internet-of-things device is an electronic thermostat, the central console unit may execute control operations causing the electronic thermostat to change from heat to cool, or vice versa, in response to certain criteria.

In one or more embodiments, the one or more processors of the central console unit are able to detect, with the communication device, at least one mobile device having other machine learned knowledge about an authorized user of the mobile device stored in a user knowledge domain of the at least one mobile device, where the user knowledge domain being separate from the Internet-of-things knowledge domain, communicating with the communication device. Illustrating by example, where the mobile device is a smartphone, it will have stored therein a user knowledge domain containing machine-learned experiences about the authorized user. In one or more embodiments, the mobile device has more information about the authorized user's data and actions than any other device. Accordingly, if another device, such as the central console unit needs to know if the user will be available at 3:00 PM, the answer to that inquiry will most likely be stored in the user knowledge domain. As such, the central console unit may use its communication device to communicate with the mobile device to obtain the most accurate response to the inquiry. In one or more embodiments, this goes beyond the central console unit or the processors of the mobile device simply looking at the user's calendar. Instead, the mobile device can employ the user knowledge domain to understand the user's habits and environment around the user such as traffic. When communicating with the communication device of the central console unit, the mobile device can interact with the central console unit by exchanging wireless communication messages and data.

In one or more embodiments, when the one or more processors detect at least one mobile device communicating with the communication device, the one or more processors of the central console unit can cause the communication device to cause the mobile device to deliver an exchange data dossier to the central console unit. Exchange data dossiers will be described in more detail below. However, in a simplified embodiment the exchange data dossier comprises data from the user knowledge domain accumulated by sensors of the mobile device that relate to a user of the mobile device.

For instance, the exchange data dossier may be a data file listing where the mobile device has been, at what times it was there, what other devices were within the vicinity of the mobile device, what actions the user took using the mobile device, what engagements the user participated in, and other changes to settings, calendars, applications, or other features of the mobile device since the most recent exchange data dossier was delivered. As such, in one embodiment the central console unit receives, when a mobile device is entering or leaving a predefined area about the central console unit, new data from the mobile device such as who, where, when, actions, engagements, arrivals, changes pertaining to the mobile device. Additionally, the central console unit can deliver to the mobile device information from the Internet-of-things knowledge domain, such as various readings and/or settings of the Internet-of-things devices it controls, in another exchange data dossier.

By causing the mobile devices to transmit these exchange data dossiers, the artificial intelligence engine in the central console unit can become smarter about the people who experience life within the predefined area about the central console unit in which the Internet-of-things devices operate. The central console unit can, thereafter, communicate with the Internet-of-things devices, receive updates from the Internet-of-things devices, respond to changes detected in received exchange data dossiers, and anticipate next actions by the user of a mobile device in one or more embodiments.

In one or more embodiments, the central console unit functions as a "central go-to person" or "watchman" that monitors a predefined environment about the central console unit covering, for example, a residential home. If each person living within the home has a mobile device, the central console unit can monitor the predefined area to determine when these persons come and go. When they come home, one or more processors of the central console unit cause each mobile device to deliver an exchange data dossier to the central console unit. These exchange data dossiers tell the "story" of what happened to the mobile device, and therefore the user, while they were away from the home. The exchange data dossiers therefore expand the personal daily knowledge of the central console unit by delivering a collection of new occurrences.

The central console unit can then coordinate data and device settings between the various people within the home as well. The central console unit can interact with the Internet-of-things devices, such as by causing preferred settings of lights, temperature, music, kitchen appliances, and the like in response to data extracted from the exchange data dossier. The central console unit can also update the Internet-of-things devices with the latest AI enabled updates. As such, the central console unit, having continuously learned experiences, specifics, personal preferences, histories, and habits of each mobile device user, provides a seamless and optimized engagement interface between Internet-of-things devices operating in the home and the users via their mobile device AI hardware experiences.

In one or more embodiments, the central console unit is situated in a home, maintaining its data in a locally stored memory. An on-board AI engine can learn from this data so that the central console unit remains "self contained," thereby not exposing personal or private data to third parties. As such, data remains under the control of the user. This can be referred to as a "local cloud," which is in contrast to having data stored "in the cloud," i.e., outside the home. In an alternate embodiment, the central console unit can serve as a user interface and communication hub, but with data, processing, AI engines, and other components stored across a network "in the cloud." With the latter embodiment, when a user experiencing life within the predefined area about the central console unit changes mobile devices, each new device can be backed up in the cloud, thereby saving the central console unit from having to "relearn" a user's behavior from a new series of exchange data dossiers. The cloud embodiment also allows for sharing "learned" information across different users/devices. In one or more embodiments, certain, but not all, data in the cloud may be allowed within the local cloud, such as to update a new mobile device when another is lost or needs replacing.

In one or more embodiments, the AI engine of the central console unit includes its own processing engine. The AI engine can sense settings and controls of both Internet-of-things devices and mobile devices in one embodiment. The AI engine receives inputs and control settings from the one or more Internet-of-things devices operating in the predefined environment. The AI engine transforms the inputs and control settings into machine learned knowledge, which accumulates in an Internet-of-things knowledge domain stored in a memory of the central console unit or, alternatively, in the cloud as noted above.

In one or more embodiments, the Internet-of-things devices operate within a predefined environment about the central console unit. In one or more embodiments, the AI engine of the central console unit is constantly receiving data, and therefore "knowledge," from the wireless communication domains of the mobile devices of users from the receipt of exchange data dossiers. Thus, the central console unit "smartly interacts" with each mobile device at the right time, location, and with the right content. In one or more embodiments where the predefined environment comprises a residential home, this allows the central console unit to be aware of who is home, whether the date and time defines a special occasion, with whom's electronic device the central console unit engages, which Internet-of-things device to actuate, at what setting the Internet-of-things device should be set, directed to what mobile device user, what location at home, which Internet-of-things device, what to avoid, what to communicate, who to inform, how to inform, when to communicate, what to predict, and what new updates have taken place.

Illustrating by example, in one or more embodiments the central console unit knows with which mobile device to interface as a function of a particular event, a particular zone within the predefined area (public, private, etc.), as well as the specifics of the Internet-of-things device and prior or current information received from exchange data dossiers. In one or more embodiments, the AI engine of the central console unit can interpret user events and responses. Where, for instance, a particular user is leaving the predefined area of the home, the central console unit causes the mobile device to access a calendar application to inform the central console unit, via an exchange data dossier, when the person will be expected to return. When that time approaches, the central console unit can actuate one or more of the Internet-of-things devices in particular locations of the predefined area that the user is expected to be in upon return. The central console unit can make the user aware of what happened while they were away by delivering information from Internet-of-things devices to the user's mobile device, as well as let other electronic devices aware of the person's return as well in one or more embodiments. In one or more embodiments, the central console unit can report to a mobile device that it has also communicated certain data to other mobile devices, e.g., when a parent comes home, as detected by the Internet-of-things devices, information from these Internet-of-things devices can be communicated to the parent as well as to anyone else triggering the Internet-of-things devices. In one or more embodiments, the Internet-of-things knowledge domain of the central console unit and the user knowledge domains of the mobile devices are kept separate but communicate with each other.

In one or more embodiments, to reduce and simply the amount of data being transferred in exchange data dossiers, as well as to simplify the system requirements for the various devices, the exchange data dossiers exchange only "domain" specific knowledge. Thus, where a mobile device maintains the user knowledge domain, only information resulting from events learned into the user knowledge domain will be transferred to the central console unit. In one or more embodiments, this data is only from a predefined recent amount of time, such as today, or such as since the last update was transferred. Similarly, where the central console unit maintains the Internet-of-things knowledge domain, only information resulting from events from that knowledge domain will be delivered to the mobile devices.

This limitation of information results in the exchange data dossiers not being simply a stream of raw or partially processed data in one or more embodiments. To the contrary, the exchange data dossier incorporates information of importance relating to its user. Illustrating by example, since a particular user may employ their smartphone for a myriad of applications, the smartphone becomes an expert on its authorized user. If the exchange data dossier were simply a data dump, the central console unit may just obtain access to a calendar application operating in the mobile device in an effort for the AI engine to "guess" when the user would return. However, in one or more embodiments the central console unit, with a query, provides a specific inquiry to the mobile device to consider, taking into account all of the past history about the user as well as any real time updates that it has received from the user throughout the day, what the return time will be. The mobile device can then respond with a succinct answer in an exchange data dossier. In such a scenario the AI engine of the central console unit may transmit a query to mobile device one inquiring, "when will user 1 come home today." In response, the mobile device transmits a return exchange data dossier informing the central console unit of the best-estimated time. This time could be updated throughout the day across a network remotely since the mobile device understands the central console unit needs this information.

It should be noted that the domain knowledge sharing that occurs through exchange data dossiers can occur both ways. For instance, the mobile device may inquire about information relating to an Internet-of-things device or other conditions within the predefined area. A mobile device may send a query asking how many people are within the predefined area and their identities. In such a situation, the central console unit could stream all camera and presence sensor data to the mobile device, thereby requiring the mobile device to just "figure it out." However, in another embodiment the central console unit causes the mobile devices operating within the predefined area to perform facial recognition, with the confirmed identities being reported back to the central console unit in an exchange data dossier. The resulting list of names could be transferred to the inquiring mobile device in an exchange data dossier.

In one or more embodiments, the central console unit can query mobile devices operating within the predefined area to obtain information. For example, if an Internet-of-things camera is positioned at the front door, and a person approaches the door, the central console unit can capture an image of the person and then deliver it in a query to the various mobile devices operating within the predefined area. The query can also include an inquiry asking if any users of the mobile devices can identify the person at the door. If someone can, i.e., if one of the mobile devices can return a response communication identifying the person at the door, then than information is delivered back to the central console unit in an exchange data dossier. The information of the exchange data dossier can be returned in various ways. For instance, a user may say, "I know Buster. He's a friend." However, in another embodiment an exchange data dossier may provide calendar information that the home is scheduled for a pest control company to send a representative to the house at this time of day. The central console unit can then determine that there is a high probability the person at the door is an exterminator from this received exchange data dossier.

The fact that the central console unit manages information from occurrences in its Internet-of-things knowledge domain, while the mobile device manages information from occurrences in its corresponding user knowledge domain, allows for a more efficient and effective use of information and resources throughout the corresponding system. For example, it can allow for a more proper concept of guests. When someone comes to visit, one of the mobile devices may be able to identify them and share details about the guest. In one or more embodiments, the mobile device belonging to the visitor can interact with the central console unit as well, thereby augmenting its locally stored information as appropriate to the situation.

To illustrate this, consider the following example. Imagine a friend visiting his family. Now imagine that it is approaching the time to eat dinner. To get the best recommendations for dinner, in one or more embodiments the central console unit queries the mobile device of the friend asking what type of food the friend prefers. Since the friend's mobile device understands what type of food—and restaurants—the friend likes as a function of past food orders, restaurant payments, etc., in one or more embodiment it will send an exchange data dossier indicating a suggested type of food or suggested restaurant. Since this is a streamlined query-exchange data dossier exchange, the mobile device of the friend does not simply dump a list of preferences. Instead, by considering additional information in a holistic approach, the mobile device belonging to the friend might send a specific restaurant recommendation as a function of the location, time of day, day of the week, etc.

To illustrate with another example, consider the situation a person's mother is visiting and is staying in the home where the central console unit is located. Now consider the situation where the mother leaves the home to say hello to a local friend. In one or more embodiments, as her mobile device exits the hoe, the central console unit causes the mobile device to deliver an exchange data dossier indicating when she will return. Rather than just being a dump of data, the exchange data dossier instead provides an informed answer. Thus, rather than delivering a daily schedule for the mother, the exchange data dossier delivers a response indicating the mother should return and re-enter the home at a specific time. This not only shifts the determination of the time from the central console unit to the mobile device, thereby freeing resources in the central console unit, but it further prevents information such as her doctor's appointment or social media followers from being transmitted as superfluous information. In short, the central console unit receives only the information it actually needs to inform other mobile devices or control various Internet-of-things devices.

In one final example, consider the situation where a stranger stops by to visit a home where the central console unit is operational. Now imagine that a friend and his family are also visiting the home. When the stranger comes, the central console unit will not recognize their corresponding mobile device. As such, in one or more embodiments the central console unit will send queries to other mobile devices operating within the home asking for the identity of the stranger. Since the friend is recognized, the central console unit will also send the query to the friend's mobile device in one or more embodiments. If it turns out that the stranger is someone the friend knows, who just happened to hear the friend was in town and wanted to swing by and chat for five minutes, the mobile device of the friend will inform the central console unit with this information in an exchange data dossier. The exchange data dossier may also include relevant information about the stranger such as name, relation, whether the visit was expected, and how long the visit is likely to take. The central console unit at that point could send a query to the mobile device of the owner of the house inquiring as to whether it is okay to allow the stranger in. Since the exchange data dossiers are not mere data dumps, but are rather focused and specific information based upon data received from the various sensors and processors of the owner's mobile device, instead of getting the notification, "There is some random stranger at your door . . . ," the owner would see something like "James is here to visit with your friend Dan. The visit was not anticipated but likely will be short." Other examples of how the central console unit can be used will be obvious to those of ordinary skill in the art having the benefit of this disclosure.

Turning now to FIG. 1, illustrated therein is one explanatory system 100 configured in accordance with one or more embodiments of the disclosure. The system 100 includes a central console unit 101. As will be described below with reference to FIG. 4, in one or more embodiments the central console unit 101 includes a communication circuit configured for wired or wireless communication with various devices, as well as one or more processors that are operable with the communication device.

In one or more embodiments, an AI engine of the central console unit 101 maintains an Internet-of-things knowledge domain 118, which includes machine-learned knowledge about one or more Internet-of-things devices 103,104,105, 106,107,108,109 that are in communication with the communication circuit. For example, the AI engine can receive inputs and/or control settings from the one or more Internet-of-things devices 103,104,105,106,107,108,109 and transforms the inputs and/or control settings into machine-learned knowledge kept in an Internet-of-things knowledge domain stored in the memory of the central console unit 101.

In one or more embodiments, the Internet-of-things knowledge domain 118 comprises machine-learned information. In one or more embodiments, the Internet-of-things knowledge domain 118 may be stored in a database. In another embodiment, the Internet-of-things knowledge domain 118 may be learned in weights used by a neural network. In another embodiment, the Internet-of-things knowledge domain 118 may take some other form usable by machine learning algorithms.

As shown in FIG. 1, the central console unit 101 has access to specific sets of inputs. Where the central console unit 101 is placed in a home, the inputs are everything coming from any Internet-of-things device 103,104,105, 106,107,108,109 or other device that is connected to the central console unit 101 through the home network.

As shown in this system 100, a central console unit 101 is operable with one or more Internet-of-things devices 103,104,105,106,107,108,109. As used herein, an Internet-of-things device is a device having a unique identity, is configured for wireless and/or wired communication across a network such as a local area network or a wide area network such as the Internet. Each Internet-of-things device can include its own circuitry, including processor(s), memory device(s), user interfaces, control circuits, and/or output device(s) that perform a function in response to control signals from the central console unit 101 and/or relative to users and/or mobile devices communicating with the Internet-of-things devices 103,104,105,106,107,108, 109.

As shown in FIG. 5, examples of Internet-of-things devices include controllable lights 501 and light fixtures, electronic thermostats 502, security systems 503, camera systems 504, entertainment systems 505, plumbing systems 506, HVAC systems 507, appliances, culinary devices 508, and so forth. Numerous other Internet-of-things devices will be obvious to those of ordinary skill in the art having the benefit of this disclosure. Also, as the numbers and types of Internet-of-things devices continue to expand, embodiments of the disclosure contemplate that new features and enhancements will be developed with which Internet-of-things devices can interact with mobile devices or adapt their behavior depending on commands received from the central console unit.

Turning back to FIG. 1, in this illustration each Internet-of-things device 103,104,105,106,107,108,109 is operating within a predefined area 102 situated about the central console unit 101. It should be noted that these Internet-of-things devices 103,104,105,106,107,108,109 could be in wired communication with the central console unit 101 across a local area network, or in wireless communication with the central console unit 101. Regardless of whether wired or wireless communication is used, in one or more embodiments the Internet-of-things devices 103,104,105, 106,107,108,109 are each configured to function within the predefined area 102, thereby allowing the central console unit 101 to be able to send data to, receive data from, and control, each of the Internet-of-things devices 103,104,105, 106,107,108,109.

Also shown in FIG. 1 are one or more mobile devices 110,111,112,113. Examples of mobile devices include smartphones, laptops, computers, tablet computers, palmtop computers, and so forth. Other examples of mobile devices will be obvious to those of ordinary skill in the art having the benefit of this disclosure.

In the illustrative embodiment of FIG. 1, the one or more mobile devices 110,111,112,113 are labeled as "sensor devices" because they are operable with one or more sensors and/or processors that gather information about authorized users of each mobile device 110,111,112,113. For instance, an imager can capture pictures of the authorized user and/or the environment. One or more processors can perform facial and/or environmental recognition on such images. A depth scanner can capture depth scans of the authorized user and/or the environment, with the processors performing identifying analysis of these scans. The one or more processors can access applications, including itineraries, contact lists, and preferred lists of images, music, videos, shops, restaurants, and so forth. A location detector can monitor where the authorized user takes the mobile device. Additional examples of these processors and/or sensors will be described below with reference to FIG. 3. Other techniques by which each mobile device 110,111,112,113 can gather information about its corresponding authorized user will be obvious to those of ordinary skill in the art having the benefit of this disclosure.

In one or more embodiments, each mobile device 110, 111,112,113 maintains a user knowledge domain 114,115, 116,117 about the authorized user of the mobile device 110,111,112,113. These user knowledge domains 114,115, 116,117 are separate and distinct from the Internet-of-things knowledge domain 118 maintained by the central console unit 101.

In the case of the mobile devices 110,111,112,113, its inputs include applications and services operating on each mobile device 110,111,112,113. The authorized user of each mobile device 110,111,112,113 is the "user" of those applications and services. Additionally, each mobile device 110, 111,112,113 includes various sensors, such as a microphone, camera, accelerometer, location detector, or other sensors. Machine learned knowledge from these inputs about an authorized user can be stored and maintained in a user knowledge domain 114,115,116,117 stored in each mobile device 110,111,112,113.

Additionally the mobile devices 110,111,112,113 and the central console unit 101 have access to other information. The central console unit 101 knows who has come and gone from the predefined area 102, which may be a residential home. By contrast, each mobile device 110,111,112,113 is with its authorized user all the time. Accordingly, each mobile device 110,111,112,113 knows where the user has been, whether they were walking or running at specific times of the day, and so forth.

However, until exchange data dossiers are exchanged between the mobile devices 110,111,112,113 and the central console unit 101, each device does not have direct access to the other's data. The mobile devices 110,111,112,113 do not know who has been in the house and when. Likewise, the central console unit 101 does not know how many steps the user has taken.

Advantageously, due to the exchange data dossiers, the individual devices do not need to try and replicate another devices algorithms and connections. The mobile devices 110,111,112,113 doe not need to know how to talk to the Internet-of-things devices 103,104,105,106,107,108,109. The central console unit 101 does not need to get a stream of sensor data from the mobile devices 110,111,112,113. If the algorithms of the mobile devices 110,111,112,113 are updated and each mobile device 110,111,112,113 does a better job figuring out what the user is doing, this information can be delivered to the central console unit 101 via an exchange data dossier—not as an upgrade to its own algorithms, but as better input from the mobile device 110,111, 112,113 when the central console unit 101 asks higher level questions.

The specific algorithms run in the central console unit 101 and the mobile devices 110,111,112,113 can be very different. Illustrating by example, there is no reason for the central console unit 101 to have a pedometer algorithm. Nor is there a reason for the central console unit 101 to request and process the accelerometer data from a mobile device. Similarly, a mobile device is not going to run a power profile algorithm on how efficient the washing machine is at home and whether it needs to be replaced. Thus each device has the ability to at one level comprehend inputs better than the other via the exchange of exchange data dossiers.

Advantageously, the use of exchange data dossiers, which comprise information from either the Internet-of-things knowledge domain 118 or the various user knowledge domains 114,115,116,117, allows the understanding and sharing of data to be more efficient. For instance, when deciding the right time to start adjusting the climate of a home to match a user's personal preferences, the central console unit 101 does not need to know the user's location, how fast they are driving, whether there is traffic, and so forth. The central console unit 101 just needs to know when the user will be home. The user's mobile device is the expert in determining this time, and further has the domain knowledge in its user knowledge domain to give the most accurate estimation.

It should be noted that in this example it could be possible for the mobile device to store and transmit all relevant data and have the central console unit 101, allowing the latter to compute the estimated time. However, embodiments of the disclosure contemplate that this would require the mobile device to first buffer up all of this data and then transmit everything. In some situations the amount of data may be limited. However, in other situations this data can be voluminous. If, for example, the central console unit 101 house instead wanted to know how many steps the user had taken in the last twenty-four hours or week or year, the mobile device would need to buffer and store a very large amount of sensor data for the central console unit 101 to process. The exchange of exchange data dossiers drawn from information from either the Internet-of-things knowledge domain 118 or the various user knowledge domains 114,115,116,117 allows a device to be an expert within a specific "knowledge domain." The exchange data dossiers thus include high-level, processed information, e.g., when will the user be home.

In one or more embodiments, the central console unit 101 and the mobile devices 110,111,112,113 communicate on a local area network, such as a local home Wi-Fi network. However, embodiments of the disclosure are not limited to this. In the above example of a user traveling home, the request and response for the estimated time of arrival can occur across several networks: Home Wi-Fi; Internet Service Provider WAN; cellular WAN; etc. Thus, it could be possible for multiple devices to be in the same location but not using a local network. Perhaps the user's mobile device has its Wi-Fi connection disabled, for example. In this case both the mobile device and the central console unit 101 should still recognize they are within the predefined area 102 because of location detectors, network scans, and so forth.

It should be noted that the domain of knowledge concept extends beyond just a mobile device or central console unit in some embodiments. It can be the case that one mobile device, e.g., mobile device 110, may want to know when another mobile device, e.g., mobile device 111, will return to the predefined area 102, or when the authorized user of mobile device 111 has finished a workout. In these cases mobile device 110 would not contact the central console unit 101. Instead, it would contact mobile device 111 directly.

Additionally, this concept of having devices act as domain experts allows for the details of how these domain experts respond to queries to be obfuscated. Irrelevant and perhaps sensitive details can be hidden.

In one or more embodiments, initial connections and associations between devices are most likely to happen when the devices are in close proximity, such as when the devices are within the predefined area 102. The central console unit 101 may machine learn who the people are that live in the predefined area 102, or a user's mobile device may machine learn about its user's friend's mobile device. The initial exchange of exchange data dossiers could be over Wi-Fi, Bluetooth.sup.™, near field communications, and so forth.

When the exchange of exchange data dossiers occurs happens under many circumstances. It can occur when devices enter and leave the predefined area 102. When one device needs to know something about the other devices knowledge domain that would be helpful, e.g., the central console unit adjusting an Internet-of-things device to keep the predefined area 102 properly climate controlled for those who live therein while saving the most power possible, it needs to know when people will be arriving well before hand.

When two devices communicate they can not only query and receive responses on domain details, but they can also provide a list of the things they about which they know. This list can grow or shrink over time as the devices become more or less capable due to changes in hardware and software.

While each mobile device 110,111,112,113 includes its own user knowledge domain 114,115,116,117, in one or more embodiments each mobile device 110,111,112,113 can enter or exit the predefined area 102 to communicate with the central console unit 101. For example, in one or more embodiments each mobile device 110,111,112,113 includes a communication device configured for local area network communication, which can communicate with the central console unit 101 situated within the predefined area 102 by exchanging data wirelessly with the central console unit 101.

In one or more embodiments, the predefined area 102 spans an area within which one or more authorized users of the mobile devices 110,111,112,113 spend portions of their lives. For instance, in one embodiment the predefined area 102 spans a house, apartment, or condominium where the one or more authorized users of the mobile devices 110,111, 112,113 live. When these authorized users of the mobile devices 110,111,112,113 enter or leave the home, the mobile devices 110,111,112,113 enter or exit predefined area 102. When the mobile devices 110,111,112,113 are operating within the predefined area 102, they can communicate with the central console unit 101.

It should be noted that embodiments of the disclosure are not so limited, however. In other embodiments, the predefined area 102 can be defined by a local area wireless network, such as that defined by a router or other communication device, where the central console unit 101 and the various Internet-of-things devices 103,104,105,106,107, 108,109 share a common Internet Protocol (IP) subnet. In still other embodiments, the predefined area 102 can move. For example, both the central console unit 101 and the Internet-of-things devices 103,104,105,106,107,108,109 can be located in a mobile home or other moveable structure. Accordingly, the predefined area 102 can move when the mobile home moves. In still another embodiment, the predefined area 102 can be defined by one or more electronic devices, such as a geo-fence that can span an area that is different from that of a local area wireless network. Numerous other ways of defining the predefined area 102 will be obvious to those of ordinary skill in the art having the benefit of this disclosure.

In one or more embodiments, the central console unit 101 receives new data from the mobile devices 110,111,112,113 when each enters or exits the predefined area 102. How this occurs is described in more detail below with reference to FIG. 6. However, in one or more embodiments this exchange results in the central console unit 101 being updated with who, where, when, actions, engagements, arrivals, changes pertaining to all authorized users of the mobile devices 110,111,112,113. As such, the central console unit 101, which can include an AI engine, becomes much "smarter" about each authorized user of each mobile device 110,111, 112,113. In one or more embodiments, the central console unit 101 is operable to communicate with each mobile device 110,111,112,113, receive updates about authorized users of the mobile devices 110,111,112,113, and responds to changes and anticipate next actions of authorized users of the mobile devices 110,111,112,113 via its AI engine.

In one or more embodiments, the central console unit 101 functions as a centralized "go-between" between the one or more mobile devices 110,111,112,113 and the one or more Internet-of-things devices 103,104,105,106,107,108,109. In one or more embodiments, when the one or more mobile devices 110,111,112,113 return "home," i.e., enter the predefined area 102, they communicate with the central console unit 101 to "tell their stories" by transmitting exchange data dossiers to the central console unit 101. This can also happen when the mobile devices 110,111,112,113 are placed on the central console unit 101 for inductive charging (where this feature is included). In one or more embodiments, making physical contact between a mobile device and the central console unit 101 serves as a visual acknowledgement of a willingness to share and communicate. The AI engine of the central console unit 101 thus constantly learns experiences, specifics, personal preferences, history and habits, of each of the authorized users of the mobile devices 110,111,112,113. In one or more embodiments, the central console unit 101 can then coordinate control of the one or more Internet-of-things devices 103,104,105,106,107,108,109 as a function of these learned experiences, as will be described in more detail below with reference to FIGS. 6-12.

Figure 2:
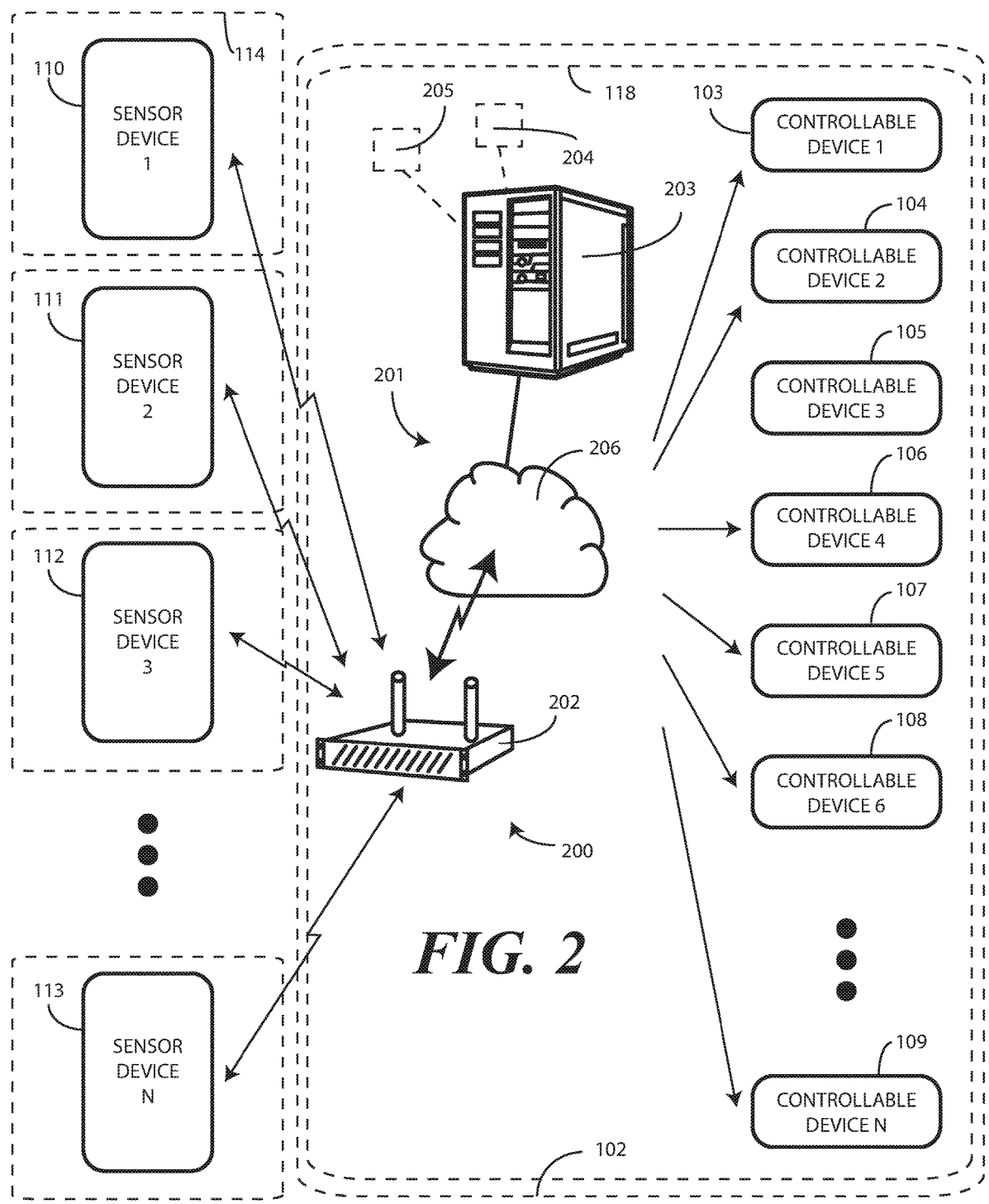
FIG. 2 illustrates another explanatory system in accordance with one or more embodiments of the disclosure.

Turning now to FIG. 2, illustrated therein is another explanatory system 100 configured in accordance with one or more embodiments of the disclosure. As with the system (100) of FIG. 1, the system 200 includes a central console unit 201. The central console unit (101) of FIG. 1 was a stand-alone device that could be, for example, located in a home, with its own processing capability, its own memory devices, and its own control systems. By contrast, the system 200 of FIG. 2 the central console unit 201 operates in the "cloud."

Illustrating by example, in the system 200 of FIG. 2, a router 202 serves as a communication hub. Note that the router 202 can also communicate with various devices by wired connections. A cloud server 203 includes a communication device 204 that is communication with the communication hub of the system 200. The cloud server 203 can also house one or more processors 205.

In one or more embodiments, the one or more processors 205 of the cloud server 203 detect, with the communication device 204 of the cloud server 203, at least one mobile device, e.g., mobile device 110, which includes other machine learned knowledge about an authorized user in a user knowledge domain 114, that is separate from the Internet-of-things knowledge domain 118, entering or exiting the predefined area 102. In one or more embodiments, upon detecting the at least one mobile device entering or exiting the predefined area 102, the one or more processors 205 receive an exchange data dossier from the at least one mobile device at the communication device 204. In one or more embodiments, the one or more processors 205 the alter an operating state of one or more Internet-of-things devices 103,104,105,106,107,108109 operating within the predefined area 102 as a function of one or more parameters extracted from the exchange data dossier.

In one or more embodiments, the router 202 is situated locally with the one or more Internet-of-things devices 103,104,105,106,107,108,109 can communicate across a network 206 with a cloud server 203, which can house the AI engine, processing, control, and other circuitry associated with the central console unit 201. The AI engine receives inputs and control settings from the one or more Internet-of-things devices 103,104,105,106,107,108,109 and transforms the inputs and control settings into machine-learned knowledge in an Internet-of-things knowledge domain 118 stored in the cloud.

For instance, when exchange data dossiers are received from the one or more mobile devices 110,111,112,113, and the central console unit 201 includes a cloud server 203 hosted "in the cloud," the received exchange data dossier may be sent to the cloud server 203 with a response communication back to the router 202. Similarly, when control of one of the one or more Internet-of-things devices 103,104,105,106,107,108,109 occurs and the central console unit 201 includes a cloud server 203 hosted "in the cloud," control signals may flow from the cloud server 203 to the router 202, and then on to the desired Internet-of-things device.

Figure 3:
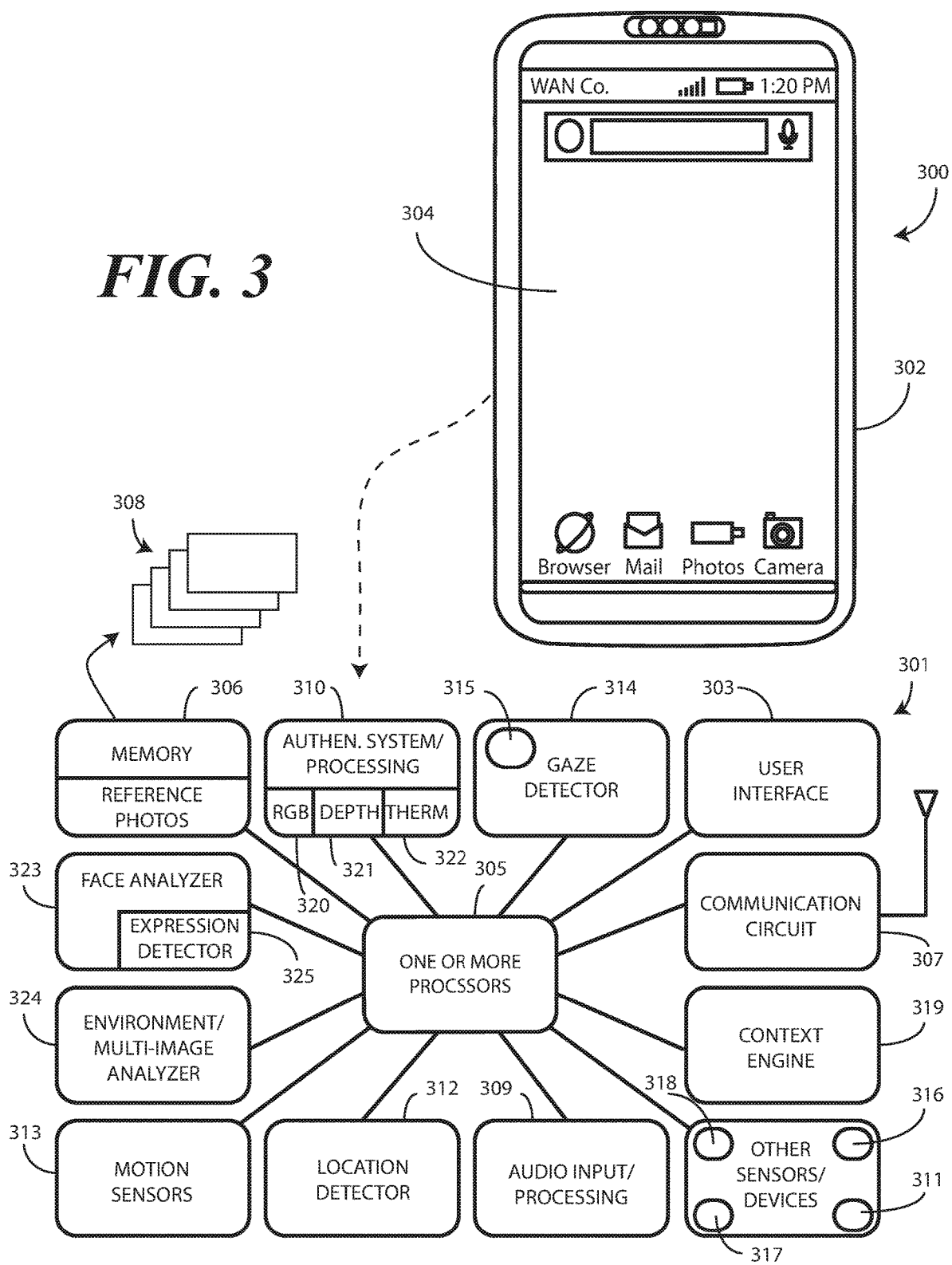
FIG. 3 illustrates one explanatory mobile device in accordance with one or more embodiments of the disclosure.

Turning now to FIG. 3, illustrated therein is one explanatory mobile device 300 in accordance with one or more embodiments of the disclosure. The mobile device 300 can be one of various types of devices. In one embodiment, the mobile device 300 is a portable electronic device, one example of which is a smartphone that will be used in the figures for illustrative purposes. However, it should be obvious to those of ordinary skill in the art having the benefit of this disclosure that mobile device 300 could be another type of device, including conventional desktop computers, palm-top computers, tablet computers, gaming devices, media players, wearable devices, or other devices. Still other devices will be obvious to those of ordinary skill in the art having the benefit of this disclosure.

A block diagram schematic 301 is shown in FIG. 3. In one or more embodiments, the block diagram schematic 301 is configured as a printed circuit board assembly disposed within a housing 302 of the mobile device 300. Various components can be electrically coupled together by conductors or a bus disposed along one or more printed circuit boards.

The illustrative block diagram schematic 301 of FIG. 3 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

The illustrative block diagram schematic includes a user interface 303. In one or more embodiments, the user interface 303 includes a display 304, which may optionally be touch-sensitive. In one embodiment, users can deliver user input to the display 304 of such an embodiment by delivering touch input from a finger, stylus, or other objects disposed proximately with the display 304. In one embodiment, the display 304 is configured as an active matrix organic light emitting diode (AMOLED) display. However, it should be noted that other types of displays, including liquid crystal displays, suitable for use with the user interface 303 would be obvious to those of ordinary skill in the art having the benefit of this disclosure.

In one embodiment, the electronic device includes one or more processors 305. In one embodiment, the one or more processors 305 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 301. Each of the application processor and the auxiliary processor(s) can be configured to process and execute executable software code to perform the various functions of the electronic device with which the block diagram schematic 301 operates. A storage device, such as memory 306, can optionally store the executable software code used by the one or more processors 305 during operation.

In this illustrative embodiment, the block diagram schematic 301 also includes a communication circuit 307 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 307 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 307 can include wireless communication circuitry, one of a receiver, a transmitter, or transceiver, and one or more antennas.

In one embodiment, the one or more processors 305 can be responsible for performing the primary functions of the electronic device with which the block diagram schematic 301 is operational. For example, in one embodiment the one or more processors 305 comprise one or more circuits operable with the user interface 303 to present presentation information to a user. The executable software code used by the one or more processors 305 can be configured as one or more modules 308 that are operable with the one or more processors 305. Such modules 308 can store instructions, control algorithms, and so forth.

In one or more embodiments, the block diagram schematic 301 includes an audio input/processor 309. The audio input/processor 309 can include hardware, executable code, and speech monitor executable code in one embodiment, such as by automatic speech recognition (ASR) techniques. The audio input/processor 309 can include, stored in memory 306, basic speech models, trained speech models, or other modules that are used by the audio input/processor 309 to receive and identify voice commands that are received with audio input captured by an audio capture device. In one embodiment, the audio input/processor 309 can include a voice recognition engine. Regardless of the specific implementation utilized in the various embodiments, the audio input/processor 309 can access various speech models to identify speech commands.

In one embodiment, the audio input/processor 309 is configured to implement a voice control feature that allows a user to speak a specific device command to cause the one or more processors 305 to execute a control operation. For example, the user may say, "Authenticate Me Now." This statement comprises a device command requesting the one or more processors to cooperate with the authentication system 310 to authenticate a user. Consequently, this device command can cause the one or more processors 305 to access the authentication system 310 and begin the authentication process. In short, in one embodiment the audio input/processor 309 listens for voice commands, processes the commands and, in conjunction with the one or more processors 305, performs a touchless authentication procedure in response to voice input.

Various sensors 311 can be operable with the one or more processors 305. FIG. 3 illustrates several examples such sensors 311. It should be noted that those shown in FIG. 3 are not comprehensive, as others will be obvious to those of ordinary skill in the art having the benefit of this disclosure. Additionally, it should be noted that the various sensors 311 shown in FIG. 3 could be used alone or in combination. Accordingly, many electronic devices will employ only subsets of the sensors shown in FIG. 3, with the particular subset defined by device application.

A first example of a sensor 311 that can be included with the other components is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 305, to detect an object in close proximity with—or touching—the surface of the display 304 or the housing of an mobile device 300 by establishing electric field lines between pairs of capacitive sensors and then detecting perturbations of those field lines.

Another example of a sensor 311 is a geo-locator that serves as a location detector 312. In one embodiment, location detector 312 is able to determine location data when the touchless authentication process occurs by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 312 autonomously or with assistance from terrestrial base stations, for example those associated with a cellular communication network or other ground based network, or as part of a Differential Global Positioning System (DGPS), as is well known by those having ordinary skill in the art. The location detector 312 may also be able to determine location by locating or triangulating terrestrial base stations of a traditional cellular network, such as a CDMA network or GSM network, or from other local area networks, such as Wi-Fi networks.

One or more motion detectors 313 can be configured as an orientation detector that determines an orientation and/or movement of the mobile device 300 in three-dimensional space. Illustrating by example, the motion detectors 313 can include an accelerometer, gyroscopes, or other device to detect device orientation and/or motion of the mobile device 300. Using an accelerometer as an example, an accelerometer can be included to detect motion of the electronic device. Additionally, the accelerometer can be used to sense some of the gestures of the user, such as one talking with their hands, running, or walking.

The motion detectors 313 can determine the spatial orientation and/or motion of a mobile device 300 in three-dimensional space by, for example, detecting a gravitational direction and acceleration due to applied forces. In addition to, or instead of, an accelerometer, an electronic compass can be included to detect the spatial orientation of the electronic device relative to the earth's magnetic field. Similarly, one or more gyroscopes can be included to detect rotational orientation of the mobile device 300.

A gaze detector 314 can comprise sensors for detecting the user's gaze point. The gaze detector 314 can include an retina scanner 315. The gaze detector 314 can optionally include sensors for detecting the alignment of a user's head in three-dimensional space. Electronic signals can then be processed for computing the direction of user's gaze in three-dimensional space. The gaze detector 314 can further be configured to detect a gaze cone corresponding to the detected gaze direction, which is a field of view within which the user may easily see without diverting their eyes or head from the detected gaze direction. The gaze detector 314 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 314 of FIG. 3.

Other components 316 operable with the one or more processors 305 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 316 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 302 of the mobile device 300. In one embodiment, the signal receiver is an infrared signal receiver to receive an infrared emission from an object such as a human being when the human is proximately located with the mobile device 300. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 305 can cause each proximity sensor component to operate at a first "effective" sensitivity so as to receive infrared emissions from a first distance. Similarly, the one or more processors 305 can cause each proximity sensor component to operate at a second sensitivity, which is less than the first sensitivity, so as to receive infrared emissions from a second distance, which is less than the first distance. The sensitivity change can be effected by causing the one or more processors 305 to interpret readings from the proximity sensor component differently.

By contrast, proximity detector components include a signal emitter and a corresponding signal receiver. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 316 can optionally include a barometer operable to sense changes in air pressure due to elevation changes or differing pressures of the mobile device 300. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 316 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the mobile device 300. Similarly, a temperature sensor can be configured to monitor temperature about an electronic device. The other components 316 can also include a flash 317. The other components 316 can also include a fingerprint sensor 318 or retina scanner 315.

A context engine 319 can then operable with the various sensors to detect, infer, capture, and otherwise determine persons and actions that are occurring in an environment about the mobile device 300. These actions can be stored in a user knowledge domain. For example, where included one embodiment of the context engine 319 determines assessed contexts and frameworks using adjustable algorithms of context assessment employing information, data, and events. These assessments may be learned through repetitive data analysis. Alternatively, a user may employ the user interface 303 to enter various parameters, constructs, rules, and/or paradigms that instruct or otherwise guide the context engine 319 in detecting multi-modal social cues, emotional states, moods, and other contextual information. The context engine 319 can comprise an artificial neural network or other similar technology in one or more embodiments.

In one or more embodiments, the context engine 319 is operable with the one or more processors 305. In some embodiments, the one or more processors 305 can control the context engine 319. In other embodiments, the context engine 319 can operate independently, delivering information gleaned from detecting multi-modal social cues, emotional states, moods, and other contextual information to the one or more processors 305. The context engine 319 can receive data from the various sensors. In one or more embodiments, the one or more processors 305 are configured to perform the operations of the context engine 319.

In one illustrative embodiment, the authentication system 310 includes an imager 320 and a depth imager 321. The authentication system 310 can optionally include a thermal sensor 322. In one embodiment, the imager 320 comprises a two-dimensional imager configured to receive at least one image of a person within an environment of the mobile device 300. In one embodiment, the imager 320 comprises a two-dimensional RGB imager. In another embodiment, the imager 320 comprises an infrared imager. Other types of imagers suitable for use as the imager 320 of the authentication system will be obvious to those of ordinary skill in the art having the benefit of this disclosure.

The thermal sensor 322, where included, can also take various forms. In one embodiment, the thermal sensor 322 is simply a proximity sensor component included with the other components 316. In another embodiment, the thermal sensor 322 comprises a simple thermopile. In another embodiment, the thermal sensor 322 comprises an infrared imager that captures the amount of thermal energy emitted by an object. Other types of thermal sensors 322 will be obvious to those of ordinary skill in the art having the benefit of this disclosure.

The depth imager 321 can take a variety of forms. In a first embodiment, the depth imager 321 comprises a pair of imagers separated by a predetermined distance, such as three to four images. This "stereo" imager works in the same way the human eyes do in that it captures images from two different angles and reconciles the two to determine distance.

In another embodiment, the depth imager 321 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 321 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 321 adds a third "z-dimension" to the x-dimension and y-dimension defining the two-dimensional image captured by the imager 320, thereby enhancing the security of using a person's face as their password in the process of authentication by facial recognition.

The authentication system 310 can be operable with a face analyzer 323 and an environmental analyzer 324. The face analyzer 323 and/or environmental analyzer 324 can be configured to process an image or depth scan of an object and determine whether the object matches predetermined criteria. For example, the face analyzer 323 and/or environmental analyzer 324 can operate as an identification module configured with optical and/or spatial recognition to identify objects using image recognition, character recognition, visual recognition, facial recognition, color recognition, shape recognition, and the like. Advantageously, the face analyzer 323 and/or environmental analyzer 324, operating in tandem with the authentication system 310, can be used as a facial recognition device to determine the identity of one or more persons detected about the mobile device 300.

In one or more embodiments, the face analyzer 323 can also include an image/gaze detection-processing engine. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 320 or the depth imager 321 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

In one or more embodiments, the face analyzer 323 is further configured to detect mood. The face analyzer 323 can infer a person's mood based upon contextual information received from the imager 320 and/or depth imager 321. For example, if a picture, a depth scan, multiple successive pictures, multiple successive depth scans, video, or other information from which a person can be identified as the owner of the mobile device 300 indicate that the owner is crying, the face analyzer 323 can infer that she is either happy or sad.

The face analyzer 323 can similarly determine emotion in one or more embodiments. Illustrating by example, a picture, a depth scan, multiple successive pictures, multiple successive depth scans, video, or other information relating to of the owner of an electronic device can allow an expression detector 325 to determine the inference of their silently communicated emotional state, e.g. joy, anger, frustration, and so forth. This can be inferred from, for example, facial expressions such as a raised eyebrow, grin, or other feature. In one or more embodiments, such emotional cues can be used as a secret password for authentication in addition to the face.

It is to be understood that the schematic block diagram of FIG. 3 is provided for illustrative purposes only and for illustrating components of explanatory electronic devices configured in accordance with one or more embodiments of the disclosure, and is not intended to be a complete schematic diagram of the various components required for an electronic device. Therefore, other electronic devices in accordance with embodiments of the disclosure may include various other components not shown in FIG. 3, or may include a combination of two or more components or a division of a particular component into two or more separate components, and still be within the scope of the present disclosure.

Turning now to FIG. 4, illustrated therein is one embodiment of a central console unit 101 configured in accordance with one or more embodiments of the disclosure. In one or more embodiments, the central console unit 101 includes one or more processors 401. The one or more processors 401 is operable with one or more output components 402, which can include an optional display, loudspeakers, lights, or other visual or aural output devices in accordance with embodiments of the disclosure. The one or more processors 401 can include a microprocessor, a group of processing components, one or more ASICs, programmable logic, or other type of processing device. The one or more processors 401 can be operable with the various components of the electronic devices configured in accordance with embodiments of the disclosure. The one or more processors 401 can be configured to process and execute executable software code to perform the various functions of the electronic devices configured in accordance with embodiments of the disclosure.

In one or more embodiments, the one or more processors 401 can include, or be operable with, an AI engine 403. The AI engine 403 can be operable with the input devices 404 of the central console unit 101, which can include one or more microphones, one or more image capture devices, depth scanners, temperature sensors, or other input devices. The AI engine 403 is capable of machine learning, which can include a series of processes for ingesting information and finding patterns, formulas, models, or other constructs that describe the information. These processes can represent and/or generalize the information in one or more embodiments. Representation can include data evaluation, while generalization can include processing additional information. Predictions can be used to provide answers to inquiries. When an answer is given, processes predicting informational meanings, comparing predicted answers and actual answers, and updates of prediction functions in view of determined distances can occur repeatedly. These processes can be constructed as one or more workflows within the AI engine 403 in one embodiment.

Knowledge domains, such as the Internet-of-things knowledge domain (118) described above can be stored in a knowledge domain database 411. Inputs, control settings, and other information can be transformed via workflows or algorithms into knowledge domains 412 in the knowledge domain database 411. The AI engine 403 can perform self-learning operations using these knowledge domains 412. The AI engine 403 can perform self-learning operations using various algorithms, transforming data to an execution code level, executing algorithms, and transforming the results into knowledge as well.

The knowledge domain database 411 can comprise an aggregation of learned knowledge, including all information ingested by the AI engine 403. When, for example, information is abstracted and classified based on user and domain type, the information can be transformed into machine-learned knowledge, which can be stored in the knowledge domain database 411.

In one or more embodiments, contextual information received from exchange data dossiers, which are explained in more detail below, is used as a learning aid for the AI engine 403 to improve recognition and execution of context-specific triggers or commands. For example, in one or more embodiments the AI engine 403 can sense settings and controls of both the Internet-of-things devices (103,104,105, 106,107,108,109) and mobile devices (110,111,112,113). In one or more embodiments, the AI engine 403 of the central console unit 101 is constantly receiving data, and therefore "knowledge," from the mobile devices (110,111,112,113) of users from the receipt of exchange data dossiers. Thus, the central console unit 101 "smartly interacts" with each mobile device (110,111,112,113) at the right time, location, and with the right content. In one or more embodiments, this allows the central console unit 101 to be aware of, for example, who is home, whether the date and time defines a special occasion, with whom's electronic device the central console unit 101 engages, which Internet-of-things device (103,104,105,106,107,108,109) to actuate, at what setting the Internet-of-things device (103,104,105,106,107,108, 109) should be set, directed to what mobile device user, what location at home, which Internet-of-things device (103,104, 105,106,107,108,109), what to avoid, what to communicate, who to inform, how to inform, when to communicate, what to predict, and what new updates have taken place.

Illustrating by example, in one or more embodiments the central console unit 101, from the AI engine 403, knows with which mobile device (110,111,112,113) to interface as a function of a particular event, a particular zone within the predefined area (102) (public, private, etc.), physical contact, such as when being inductively charged, as well as the specifics of the Internet-of-things device (103,104,105,106, 107,108,109) and prior or current information received from exchange data dossiers. In one or more embodiments, the AI engine 403 of the central console unit 101 can interpret user events and responses. Where, for instance, a particular user is leaving the predefined area (102) of the home, the central console unit 101 causes the mobile device to access a calendar application to inform the central console unit, via an exchange data dossier, when the person will be expected to return. When that time approaches, the central console unit 101 can actuate one or more of the Internet-of-things devices (103,104,105,106,107,108,109) in particular locations of the predefined area (102) that the user is expected to be in upon return. The central console unit 101 can make other electronic devices aware of the person's return as well in one or more embodiments.

Thus, the AI engine 403 improves the contextual control capability of the central console unit 101 by actively monitoring and learning from user behavior and subsequent user action. In one or more embodiments, the AI engine 403 can infer new triggers and commands based on receipt of exchange data dossiers. In another embodiment, the AI engine 403 allows the central console unit 101 to predict user behavior after a sufficient period of monitoring via the receipt of the exchange data dossiers.

A storage device, such as memory 405, can optionally store the executable software code used by the one or more processors 305 during operation. The memory 405 can also house the knowledge domain database 411. The memory 405 may include either or both static and dynamic memory components, may be used for storing both embedded code and user data. The software code can embody program instructions and methods to operate the various functions of the central console unit 101 and/or AI engine 403 configured in accordance with embodiments of the disclosure, and also to execute software or firmware applications and modules. The one or more processors 401 can execute this software or firmware, and/or interact with modules, to provide device functionality.

In one or more embodiments, the central console unit 101 is programmed such that the one or more processors 401 and memory 405 interact with the other components of the central console unit 101 to perform certain functions. The one or more processors 401 may include or implement various modules and execute programs for initiating different activities such as controlling connected Internet-of-things devices, transferring data, and communicating with mobile devices as described herein. Illustrating by example, the one or more processors 401 implement the AI engine 403 in one or more embodiments.

In one or more embodiments the central console unit 101 can receive exchange data dossiers from one or more mobile devices. These exchange data dossiers can include data accumulated by sensors of the mobile device that relate to a user of the mobile device. For instance, the exchange data dossier may be a data file listing where the mobile device has been, at what times it was there, what other devices were within the vicinity of the mobile device, what actions the user took using the mobile device, what engagements the user participated in, and other changes to settings, calendars, applications, or other features of the mobile device since the most recent exchange data dossier was delivered. The exchange data dossier therefore provides the central console unit 101 and its AI engine 403 with the "who, where, when," actions, engagements, arrivals, changes pertaining to the mobile device. The AI engine 403 in the central console unit 101 can therefore become smarter about the people who experience life within the predefined area about the central console unit 101.

In one or more embodiments, the exchange data dossiers include interests or preferences of a user of a mobile device. Examples of interests include hobbies, jobs, friends, sports, and so forth. Examples of preferences include food preferences, beverage preferences, restaurant preferences, vacation location preferences, mode of transportation preferences, climate preferences (temperature, lighting level, etc.), activity preferences, and so forth. In one or more embodiments, the one or more processors 401 of the central console unit 101 can maintain a user preference log 409 comprising data parameters 410 extracted from prior exchange data dossiers received from a mobile device. The AI engine 403 can then use these data parameters 410 to advance its learning. In one or more embodiments, the one or more processors 401 further update the user preference log 409 with one or more data parameters extracted from the exchange data dossiers each time new exchange data dossiers are received.

In one or more embodiments, the central console unit includes a communication device 406 that is configured for wireless communication, as well as optionally configured for wired communication. The communication device 406 can communicate with one or more other devices, domains, or networks. In one or more embodiments, the communication device 406 communicates with devices operating within a predefined area (102), as noted above.

In one or more embodiments, the communication device 406 can be configured to communicate with any of the following: a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication device 406 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication device 406 can include wireless communication circuitry, one of a receiver, a transmitter, or transceiver, and one or more antennas.

The one or more processors 401 can also be operable with other components 407. The other components 407 can include an acoustic detector 408, such as a microphone. The other components 407 can also include one or more proximity sensors to detect the presence of nearby objects. The other components 407 may include video input components such as optical sensors, mechanical input components such as buttons, touch pad sensors, touch screen sensors, capacitive sensors, motion detectors, and switches.

Similarly, the other components 407 can include output components 402 such as video, audio, and/or mechanical outputs. Other examples of output components 402 include audio output components such as speaker ports or other alarms and/or buzzers and/or a mechanical output component such as vibrating or motion-based mechanisms.

In one or more embodiments, the central console unit 101 includes charging circuitry 413 that allows it to function like a charging dock. In one or more embodiments, the central console unit 101 includes an inductive charging surface that is devoid of electrical contacts and that allows charging of an electronic device in any orientation when placed upon the inductive charging surface. The charging circuitry 413 can deliver voltage and/or current to an electrical coupler of the central console unit 101 to allow a user to charge, for example, a mobile device by coupling the mobile device to, or placing the mobile device on, the central console unit 101.

It is to be understood that the central console unit 101 of FIG. 4 is illustrative only, and is not intended to be a complete schematic diagram of the various components required to construct a central console unit 101 configured in accordance with one or more embodiments of the disclosure. Therefore, other central console units configured in accordance with embodiments of the disclosure may include various other components not shown in FIG. 4, or may include a combination of two or more components or a division of a particular component into two or more separate components, and still be within the scope of the present disclosure.

Figure 6:
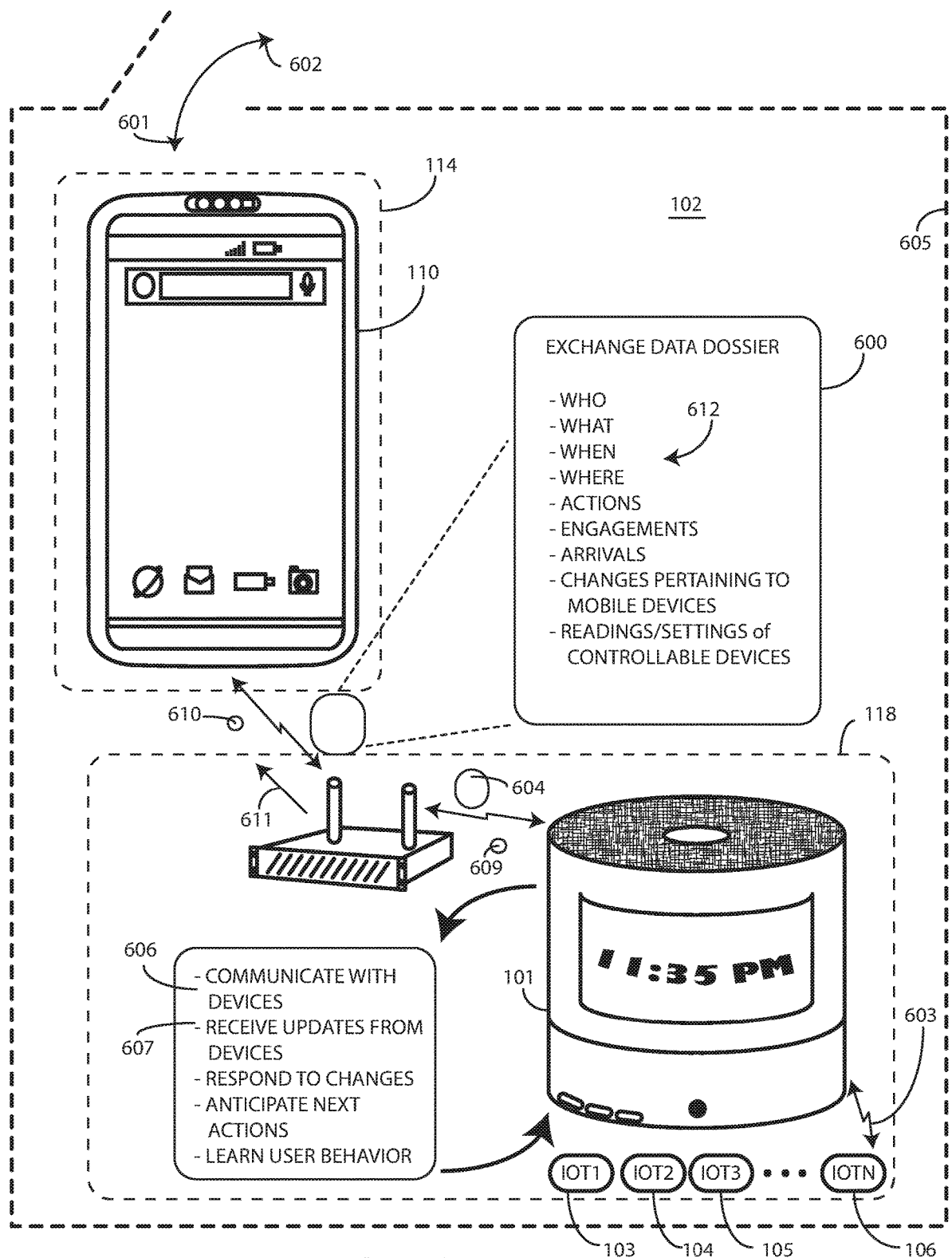
FIG. 6 illustrates one or more method steps in accordance with one or more embodiments of the disclosure.

Turning now to FIG. 6, illustrated therein is one embodiment of the disclosure. As shown in FIG. 6, central console unit 101 includes a communication device operating within a predefined area 102. In this illustration, the predefined area 102 comprises a residential home 605. One or more processors of the central console unit 101 are operable to control one or more Internet-of-things devices 103,104,105,106 operating within the predefined area 102 as well. As described above, the central console unit 101 receives inputs and control settings from the one or more Internet-of-things devices 103,104,105,106 and transforms the inputs and control settings into machine learned knowledge in an Internet-of-things knowledge domain 118 stored in the central console unit 101 or in the cloud.

In one or more embodiments, the one or more processors of the central console unit 101 detect, with the communication device, at least one mobile device 110 entering 601 or exiting 602 the predefined area 102. In this illustration, the at least one mobile device 110 is entering 601 the predefined area 102. In one or more embodiments, the mobile device 110 has stored therein other machine learned knowledge about an authorized user in a user knowledge domain 114.

In one or more embodiments, the user knowledge domain 114 is kept separate from the Internet-of-things knowledge domain 118.

In one or more embodiments, upon detecting the at least one mobile device 110 entering 601 or exiting 602 the predefined area 102, the one or more processors of the central console unit 101 to cause the communication device of the central console unit 101 to cause the at least one mobile device 110 to deliver an exchange data dossier 600 to the communication device of the central console unit 101. Illustrating by example, the one or more processors of the central console unit 101 can cause the communication device of the central console unit 101 to deliver an interrogation communication 611 to the mobile device 110 in response to detecting the mobile device 110 entering or exiting the predefined area 102. In one or more embodiments, the exchange data dossier 600 comprises a response communication to the interrogation communication 611.

In one or more embodiments, the one or more processors of the central console unit 101 then perform a control operation 603 altering a behavior of at least one Internet-of-things device 106 in response to the communication device of the central console unit 101 receiving the exchange data dossier 600. For example, if the Internet-of-things device 106 is an electronic thermostat, the central console unit 101 may execute a control operation 603 causing the electronic thermostat to change from heat to cool, or vice versa, in response to data extracted from the exchange data dossier 600.

In one or more embodiments, the exchange data dossier 600 comprises data accumulated by sensors (described above with reference to FIG. 3) of the mobile device 110 that relate to an authorized user of the mobile device 110, how the user has interacted with the mobile device 110, where the user has taken the mobile device 110, and what data is stored in, or operable with, the mobile device 110. In one or more embodiments, the exchange data dossier 600 comprises data from the mobile device 110 such as who, where, when, actions, engagements, arrivals, changes pertaining to the mobile device 110, and so forth. In one or more embodiments, the exchange data dossier 600 includes only changes since the previous exchange data dossier was sent.

For instance, in one or more embodiments the exchange data dossier 600 may be a data file listing where the mobile device 110 has been, at what times the mobile device 110 was there, what other mobile devices were within the vicinity of the mobile device 110, what actions the authorized user took when using the mobile device 110, what engagements the user participated in, and other changes to settings, calendars, applications, or other features of the mobile device 110 since the most recent exchange data dossier was delivered. As such, in one embodiment the central console unit 101 receives, when the mobile device 110 is entering 601 or leaving 602 the predefined area 102, new data from the mobile device 110 such as who, where, when, actions, engagements, arrivals, changes pertaining to the mobile device 110.

Additionally, the central console unit 101 can deliver to the mobile device 110 various readings and/or settings of the Internet-of-things devices 103,104,105,106 it controls in another exchange data dossier 604. By causing the mobile device 110 to transmit these exchange data dossiers 600, the AI engine (403) of the central console unit 101 can become smarter about the people who experience life within the predefined area 102. The central console unit 101 can, thereafter, communicate with the Internet-of-things devices 103,104,105,106, receive updates from the Internet-ofthings devices 103,104,105,106, respond to changes detected in received exchange data dossiers, and anticipate next actions by the user of a mobile device 110 in one or more embodiments.

In one or more embodiments, the one or more processors of the central console unit extract one or more data parameters 612 from the exchange data dossier 600 upon receiving the exchange data dossier 600. The one or more processors of the central console unit 101 then perform, in one or more embodiments, a control operation 603 altering a behavior of at least one Internet-of-things device 106 as a function of one or more data parameters 612.

In one or more embodiments, the one or more processors of the central console unit 101 are able to detect, with the communication device, at least one mobile device 110 operating within the predefined area 102. The central console unit 101 can detect the smartphone entering 601, or exiingt 602, the predefined area 102 as well. When operating in the predefined area 102, the mobile device 110 can interact with the central console unit 101 by exchanging electronic communication messages and data.

In one or more embodiments, the central console unit 101 functions as a "central go-to person" or "watchman" that monitors a predefined area 102 covering, for example, a residential home 605. If each person living within the home 605 has a mobile device, the central console unit 101 can monitor the predefined area 102 to determine when these persons come and go.

When they come home 605, one or more processors of the central console unit 101 cause each mobile device 110 to deliver an exchange data dossier 600 to the central console unit 101. These exchange data dossier 600 tells the "story" of what happened to the mobile device 110, and therefore the user, while they were away from the home 605. The exchange data dossier 600 therefore expands the personal daily knowledge of the central console unit 101 by delivering a collection of new occurrences.

The central console unit 101 can then coordinate data and device settings between the various people within the home as well. The central console unit 101 can interact 606 with the Internet-of-things devices 103,104,105,106, such as by causing preferred settings of lights, temperature, music, kitchen appliances, and the like in response to data extracted from the exchange data dossier 600. The central console unit 101 can also update 607 the Internet-of-things devices 103,104,105,106 with the latest AI enabled updates. As such, the central console unit 101, having continuously learned experiences, specifics, personal preferences, histories, and habits of each mobile device user, provides a seamless and optimized engagement interface between Internet-of-things devices 103,104,105,106 operating in the home 605 and the users via their mobile device AI hardware experiences.

In the illustrative embodiment of FIG. 6, the central console unit 101 is situated in the home 605, maintaining its data in a locally stored memory. As described above, the on-board AI engine (403) can learn from this data so that the central console unit 101 remains "self contained," thereby not exposing personal or private data to third parties. However, as described above with reference to FIG. 2, in an alternate embodiment the central console unit 101 can serve as a user interface and communication hub, but with data, processing, AI engines, and other components stored across a network in the cloud. With the latter embodiment, when a user experiencing life within the predefined area 102 of the central console unit 101 changes mobile devices, each new device can be backed up in the cloud, thereby saving the central console unit 101 from having to "relearn" a user's behavior from a new series of exchange data dossiers. The cloud embodiment also allows for sharing "learned" information across different users/devices.

In one or more embodiments, the AI engine (403) of the central console unit 101 includes its own processing engine. The AI engine (403) can sense settings and controls of both Internet-of-things devices 103,104,105,106 and mobile devices 110 in one embodiment. In one or more embodiments, the AI engine (403) of the central console unit 101 is constantly receiving data, and therefore "knowledge," from the user knowledge domains 114 of the mobile devices 110 of users from the receipt of exchange data dossiers 600. Thus, the central console unit 101 therefore "smartly interacts" with each mobile device 110 at the right time, location, and with the right content.

In one or more embodiments, this allows the central console unit 101 to be aware of who is in the home 605, who failed to arrive after they were expected to be in the home 605, whether the date and time defines a special occasion, the identity of the authorized user of the mobile device 110 with which the central console unit 101 engages, which Internet-of-things device 106 to actuate, at what setting the Internet-of-things device 106 should be set. The Internet-of-things device 106 can be set so as to please a particular mobile device user, in a particular location of the home 605. The central console unit 101 thus knows which Internet-of-things device 106 to actuate, what to avoid, what to communicate, whom to inform, how to inform, when to communicate, what to predict, and what new updates have taken place.

Illustrating by example, in one or more embodiments the central console unit 101 knows with which mobile device 110 to interface as a function of a particular event, a particular zone within the predefined area 102 (public, private, etc.), as well as the specifics of the Internet-of-things device 106 and prior or current information received from exchange data dossiers 600. In one or more embodiments, the AI engine (403) of the central console unit 101 can interpret user events and responses from the exchange data dossier 600.

Where, for instance, a particular user is exiting 602 the predefined area 102 of the home 605, the central console unit 101 causes the mobile device 110 to access a calendar application to inform the central console unit 101, via an exchange data dossier 600, when the person will be expected to return. When that time approaches, the central console unit 101 can actuate one or more of the Internet-of-things devices 103,104,105,106 in particular locations of the predefined area 102 that the user is expected to be in upon return. The central console unit 101 can make other electronic devices aware of the person's return as well in one or more embodiments.

While entering 601 and exiting 602 can trigger the delivery of the exchange data dossier 600, embodiments of the disclosure are not so limited. In other embodiments, a user can cause the central console unit 101 or the mobile device 110 to deliver to the other an exchange data dossier 600 by using a voice command. In another embodiment, a user can cause the central console unit 101 or the mobile device 110 to deliver to the other an exchange data dossier 600 by making a predefined gesture. Other techniques for causing the central console unit 101 or the mobile device 110 to deliver to the other an exchange data dossier 600 will be obvious to those of ordinary skill in the art having the benefit of this disclosure.

In one or more embodiments, to reduce and simply the amount of data being transferred in exchange data dossier 600, as well as to simplify the system requirements for the various devices, the exchange data dossier 600 exchange only "domain" specific knowledge. Thus, where a mobile device 110 maintains a user knowledge domain 114, only information from events monitored in the user knowledge domain 114 will be transferred to the central console unit 101. Similarly, where the central console unit 101 maintains an internet-of-things knowledge domain 118, only information resulting from events monitored in that internet-of-things knowledge domain 118 will be delivered to the mobile device 110.

This limitation of information results in the exchange data dossier 600 not being simply a stream of raw or partially processed data in one or more embodiments. To the contrary, the exchange data dossier 600 incorporates information of importance relating to its user. Illustrating by example, since a particular user may employ their mobile device 110 for a myriad of applications, the mobile device 110 becomes an expert on its authorized user. If the exchange data dossier 600 were simply a data dump, the central console unit 101 may just obtain access to a calendar application operating in the mobile device in an effort for the AI engine (403) to "guess" when the user would return.

However, in one or more embodiments the central console unit 101, with a query, provides a specific inquiry to the mobile device 110 to consider, taking into account all of the past history about the user as well as any real time updates that it has received from the user throughout the day, what the return time will be. The mobile device 110 can then respond with a succinct answer in an exchange data dossier 600. In such a scenario the AI engine of the central console unit 101 may transmit a query 609 to mobile device 110 one inquiring, "when will user 1 come home today." In response, the mobile device 110 transmits a return exchange data dossier 600 informing the central console unit 101 of the best-estimated time. This time could be updated throughout the day across a network remotely since the mobile device 110 understands the central console unit 101 needs this information.

It should be noted that the domain knowledge sharing that occurs through exchange data dossiers can occur both ways. For instance, the mobile device 110 may inquire about information relating to an Internet-of-things device, e.g., Internet-of-things device 104, to whom else this information was communicated, or other conditions within the predefined area 102. In one or more embodiments, the communication device of the central console unit 101 receives an interrogation communication, shown as a query 610 in FIG. 6, from the mobile device 110 in response to the mobile device 110 entering 602 or exiting 603 the predefined area 102. In one or more embodiments, the one or more processors of the central console unit 101 then cause the communication device of the central console unit 101 to deliver a response communication to the interrogation communication, which can be in the form of an exchange data dossier 604, to the mobile device 110.

For example, the mobile device 110 may send a query 610 asking how many people are within the predefined area 102, their identities, and so forth. In such a situation, the central console unit 101 could stream all camera and presence sensor data received from the Internet-of-things devices 103,104,105,106 to the mobile device 110, thereby requiring the mobile device 110 to just "figure it out." However, in another embodiment the central console unit 101 causes the various mobile devices operating within the predefined area 102 to perform facial recognition as described above with reference to FIG. 3. The central console unit 101 can then cause the mobile devices to return exchange data dossiers that include the confirmed identities back to the central console unit 101. The resulting list of names could be transferred to the inquiring mobile device 110 in an exchange data dossier 604.

Figure 7:
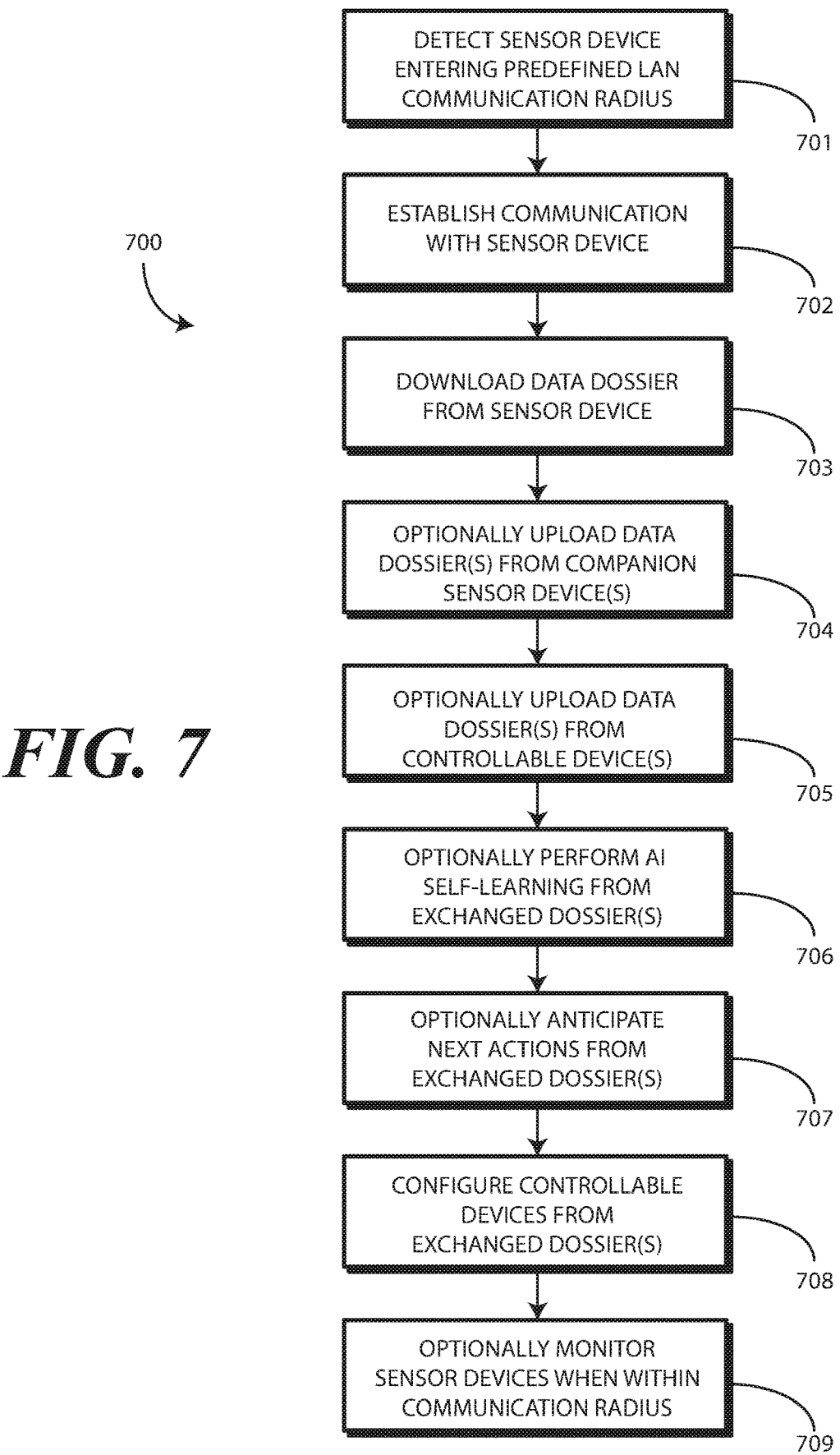
FIG. 7 illustrates one explanatory method in accordance with one or more embodiments of the disclosure.

Turning now to FIG. 7, illustrated therein is one explanatory method 700 in accordance with one or more embodiments of the disclosure. The method 700 is suitable for operation in a central console unit configured in accordance with one or more embodiments of the disclosure, be it self-contained or operating in the cloud.

At step 701, the method 700 detects, with a communication device of a central console unit, at least one mobile device having stored therein machine learned knowledge about an authorized user in a user knowledge domain entering a predefined area and communicating with the communication device of the central console unit. In one or more embodiments, this occurs when the mobile device comes within a local area network communication radius within which the communication device of the central console unit can reliably exchange data messages with the mobile device.

At step 702, the method 700 includes establishing, with the wireless communication circuit of the central console unit, a communication session with the mobile device. This can include handshaking operations, the assignment of an Internet Protocol (IP) address, and so forth.

At step 703, the method 700 includes causing, by one or more processors of the central console unit that are operable with the communication device of the central console unit, the at least one mobile device to deliver an exchange data dossier to the communication device of the central console unit. In one or more embodiments, the exchange data dossier delivered at step 703 comprises at least one of a preference of an interest of at least one user of the at least one mobile device. Step 703 can also include extracting, by the one or more processors of the central console unit, the at least one of the preference or the interest of the at least one user of the at least one mobile device.

The preference or interest can take a variety of forms. Illustrating by example, in one or more embodiments the preference comprises a setting of an Internet-of-things device. If the Internet-of-things device is a thermostat, the preference might be a thermostat setting. If the Internet-of-things device is a light fixture, the preference might include a brightness level of the light fixture, and so forth.

The preference may include information from the user knowledge domain stored within the mobile device. For example, the preference may indicate that a person likes to read in the den from 5:00 to 7:00 PM, eat dinner in the dining room from 7:00 PM to 8:00 PM, wash dishes in the kitchen from 8:00 PM to 8:30 PM, and then watch television in the bedroom from 8:30 PM until 10:00 PM. The preference may include Internet-of-things device settings for each room. For instance, the lights may be bright for reading in the den, romantically dimmed in the dining room for dinner, bright in the kitchen for the dishes, and dim for television watching in the bedroom. Temperature settings, whether the television is ON or OFF, whether music is playing, and so forth can be similarly controlled.

The preference may relate to an activity. For instance, if a person is visiting his family and it is time to eat dinner, in one or more embodiments the central console unit might query the mobile device of the person asking what type of food the friend prefers. Since the friend's mobile device understands what type of food—and restaurants—the friend likes as a function of past food orders, restaurant payments, etc., in one or more embodiment it will send an exchange data dossier indicating a suggested type of food or suggested restaurant. The preference of the exchange data dossier might include a specific restaurant recommendation as a function of the location, time of day, day of the week, etc. These examples of preferences and interests are illustrative only, as numerous others will be obvious to those of ordinary skill in the art having the benefit of this disclosure.

At step 704, the method 700 optionally uploads, with the communication device of the central console unit, data dossiers from other mobile devices. For example, one mobile device may inquire about conditions within the predefined area. The mobile device may send a query to the central console unit asking how many people are within the predefined area and their identities. In such a situation, step 704 of the method 700 comprises uploading data exchange dossier information back to the requesting device. If, for example, exchange data dossiers had been received from other mobile devices, and these exchange data dossiers included identities of the users of these devices, step 704 could include delivering the confirmed identities back to the inquiring mobile device in an exchange data dossier.

At step 705, the method 700 optionally uploads, with the communication device of the central console unit, a data dossier comprising information about one or more Internet-of-things devices. This can occur in the following situation: consider when a first mobile device is operating in a predefined area. As previously described, upon detecting the first mobile device entering or exiting the predefined area, the central console unit causes the at least one mobile device to deliver an exchange data dossier to the central console unit. This can include the identity of the owner of the first mobile device.

Now consider a second mobile device entering the predefined area. When this occurs, the central console unit causes the second mobile device to deliver an exchange data dossier to the central console unit. However, the second mobile device may send a message to the central console unit asking who is home. When this occurs, the central console unit will deliver a second exchange data dossier to the mobile device making the inquiry upon the entering or exiting the predefined area. Since this second exchange data dossier will include the identity of the owner of the electronic device already within the predefined area, the second exchange data dossier will comprise one or more data parameters concerning the user of that mobile device. Accordingly, in one or more embodiments where step 701 comprises at least one other mobile device being detected entering or exiting the predefined area, step 703 comprises receiving, at the communication device, another exchange data dossier from the at least one other mobile device. Step 705 can then include transmitting data parameters extracted from the other exchange data dossier to the at least one mobile device.

In another example, a mobile device may inquire about information relating to an Internet-of-things device, e.g., an electronic thermostat, security system, or entertainment system that is operating within the predefined area. The mobile device may send a query to the central console unit asking, for example, what the temperature is in the house upstairs or downstairs, whether the oven or stove is on, or how many lights are turned on. In such a situation, step 705 of the method 700 comprises the central console unit polling the various Internet-of-things devices to determine the status of each, the settings of each, and so forth. Step 705 can then include delivering answers to the inquiring mobile device in an exchange data dossier. The answers might include 74 degrees downstairs, 76 degrees upstairs, the oven and stove are both OFF, and there are four lights on downstairs and two on upstairs in this example. These answers are illustrative and are in responses to the hypothetical inquiries set forth above. Other inquiries will generate other answers, as will be readily appreciated by one of ordinary skill in the art having the benefit of this disclosure.

At step 706, the method 700 includes optionally performing learning operations with an AI engine of a central console unit. In one or more embodiments, contextual information received from exchange data dossiers is used as a learning aid for the AI engine to improve recognition of user preferences and activities, which facilitates better execution of context-specific triggers or commands for Internet-of-things devices that are in communication with the central console. In one embodiment, this occurs at step 706. Step 706 can include receiving inputs from the one or more Internet-of-things devices and transforming the inputs and control settings into machine learned knowledge stored in an Internet-of-things knowledge domain.

For example, step 706 can include the AI engine sensing settings and controls of both Internet-of-things devices and mobile devices. By receiving exchange data dossiers at steps 703-704, and/or by querying Internet-of-things devices at step 705, step 706 can include the AI engine constantly gaining "knowledge" from the mobile devices and Internet-of-things devices. This allows the AI engine to be aware of, for example, who is home, whether the date and time defines a special occasion, with whom's electronic device the central console unit 101 engages, which Internet-of-things device to actuate, at what setting the Internet-of-things device should be set, at what location within the home, what to avoid, what to communicate, who to inform, how to inform, when to communicate, what to predict, and what new updates have taken place. Step 706 thus includes the AI engine improving it contextual control capability by actively monitoring and learning from user behavior and subsequent user action.

At step 707, the method 700 can include the AI engine inferring new triggers and commands based on receipt of exchange data dossiers. This step 707 allows the AI engine to predict user behavior after a sufficient period of monitoring via the receipt of the exchange data dossiers.

At step 708, the method 700 includes altering an operating state of one or more Internet-of-things devices operating within the predefined area as a function of the at least one of the preference or the interest of the at least one user of the at least one mobile device. This can include turning on certain lights, causing a preferred playlist to begin playing on a music player, adjusting the temperature, turning on the stove, turning a slow cooker from high to low, and so forth.

Optional step 709 can include monitoring the mobile devices as they move and interact with the predefined area. For example, the central console unit may monitor each mobile device as it is used in the home to determine when lights are turned ON, when lights are turned OFF, and so forth. The AI engine can use this information to update its knowledge of each user's habits.

Figure 8:
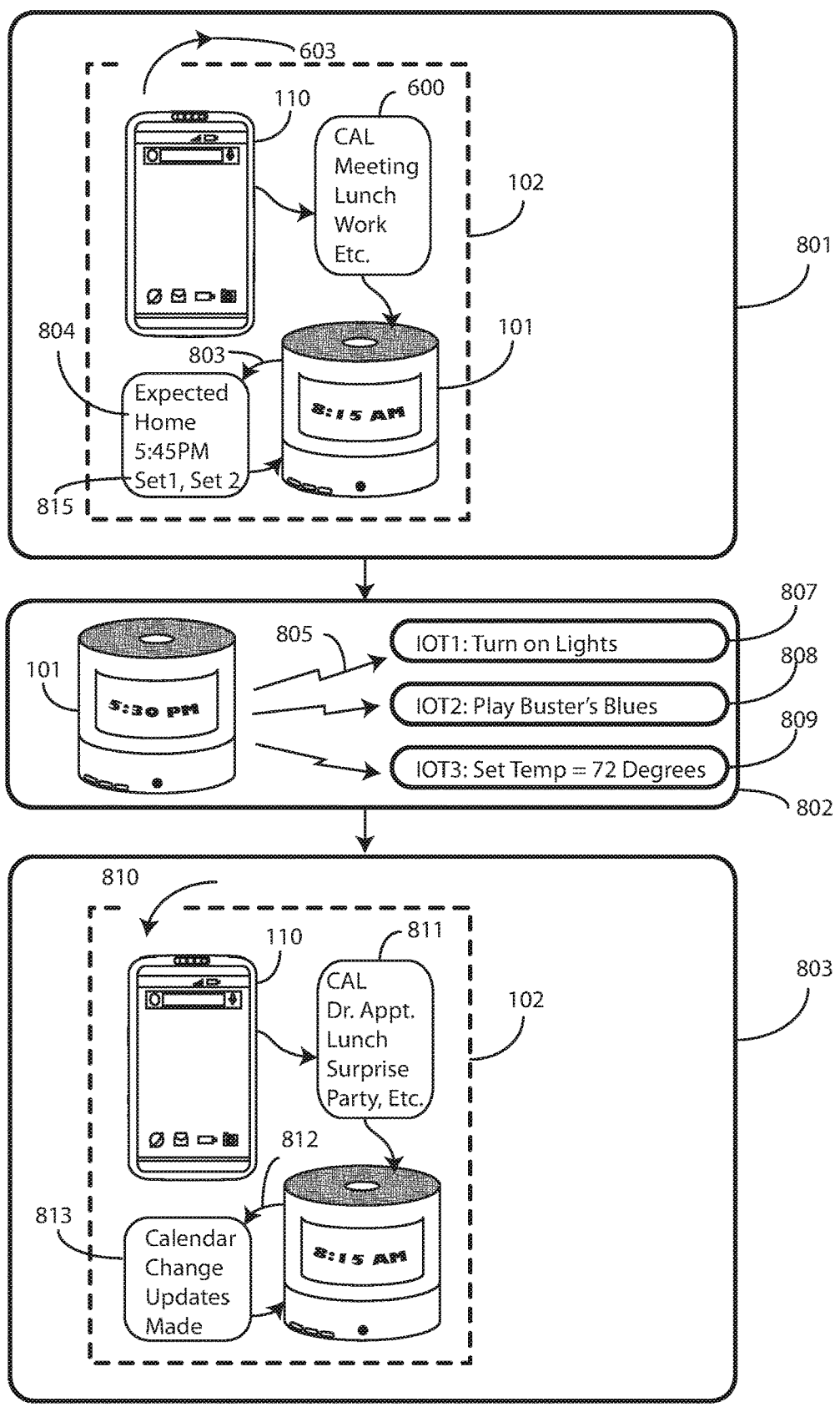
FIG. 8 illustrates one or more method steps in accordance with one or more embodiments of the disclosure.

Turning now to FIG. 8, illustrated therein are one or more method steps 801,802,803 in accordance with one or more embodiments of the disclosure. At step 801, a communication device of a central console unit 101 operates within a predefined area 102. As previously described, one or more processors of the central console unit 101 are operable with the communication device of the central console unit 101.

The one or more processors control one or more Internet-of-things devices 807,808,809 operating within the predefined area 102.

As shown at step 801, the one or more processors of the central console unit 101 detect, by exchanging data messages with a mobile device 110 using the communication device of the central console unit 101, the mobile device 110 exiting 603 the predefined area 102. In one or more embodiments, upon detecting the mobile device 110 exiting 603 the predefined area 102, the one or more processors of the central console unit 101 cause the communication device of the central console unit 101 to cause the mobile device 110 to deliver an exchange data dossier 600 to the communication device of the central console unit 101.

Such a situation might occur in the following example. When a person's mother is visiting and is staying in the home located within the predefined area 102 of the central console unit 101, and the mother leaves—taking her mobile device 110—the predefined area 102 to say hello to a local friend, the central console unit 101 detects her mobile device 110 exiting 603 the predefined area 102. When this occurs, the central console unit 101 causes the mobile device 110 to deliver an exchange data dossier 600 indicating when she will return. In this example, calendar data is delivered in the exchange data dossier 600.

At step 801, the one or more processors of the central console unit 101 extract 803 one or more data parameters 804 from the exchange data dossier 600. In one or more embodiments, the one or more data parameters 804 comprising a return time when the mobile device 110 is expected to re-enter the predefined area 102. In this example, the return time is inferred due to the fact that a dump of calendar data was delivered in the exchange data dossier 600. Step 801 thus includes the one or more processors of the central console unit 101 predicting a return time when the mobile device 110 will re-enter the predefined area 102 from one or more parameters of the exchange data dossier 600. In this example, the predicted return time is the end of the last event plus a commute time back to the home.

Other information can be included in the exchange data dossier 600. In this example, step 801 further includes the one or more processors extracting one or more other data parameters 815 from the exchange data dossier 600. In one or more embodiments, the other data parameters 815 comprise at least one Internet-of-things device setting for at least one Internet-of-things device.

At step 802, the one or more processors of the central console unit 101 perform a control operation 805 altering a behavior of at least one Internet-of-things device 807,808,809. In one or more embodiments, this control operation 805 is performed at predetermined amount of time prior to the return time. In this example, the control operation 805 comprises turning on Internet-of-things device 807, causing Internet-of-things device 808 to play "Buster's Blues," and causing Internet-of-things device 809, which is a thermostat, to set the temperature to 72 degrees. Accordingly, when the mother comes home at 5:45 PM, the home is just the way she likes it.

At step 803, the central console unit 101 detects the mobile device 110 re-entering 810 the predefined area 102. In one or more embodiments, upon detecting the mobile device 110 re-entering 810 the predefined area 102, the central console unit 101 causes the mobile device 110 to deliver another exchange data dossier 811 the central console unit 101. This new exchange data dossier 811 includes the "who, what, when, etc." that occurred with the mobile device 110 while the mobile device 110 was outside the predefined area 102.

One or more processors of the central console unit 101 can then extract 812 one or more data parameters 813 from the exchange data dossier 811. As before, these one or more data parameters 813 can include at least one of an interest or a preference of at least one user of the at least one mobile device 110. The AI engine of the central console unit 101 can then continue to learn about the user by ingesting the data parameters 813.

Figure 9:
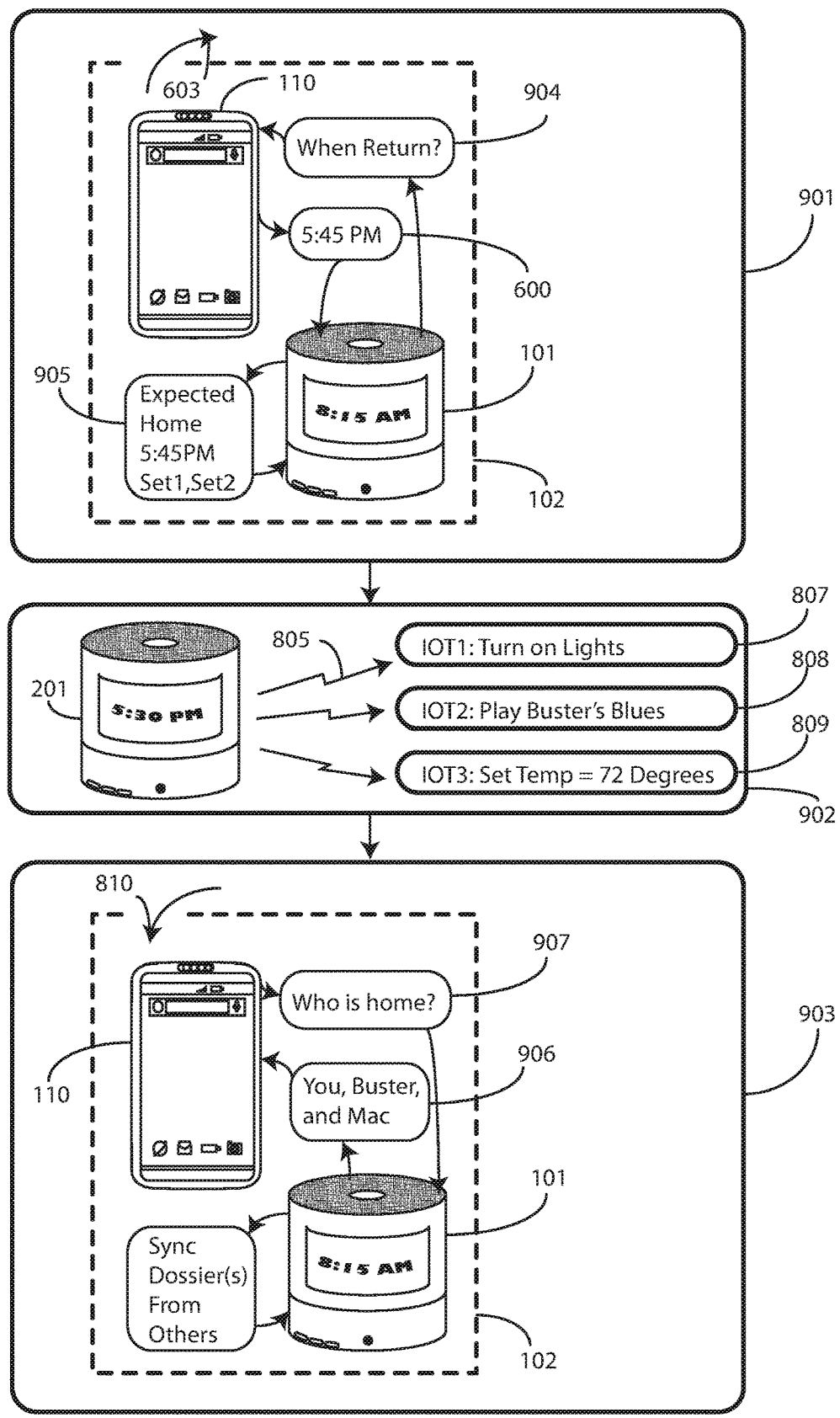
FIG. 9 illustrates one or more method steps in accordance with one or more embodiments of the disclosure.

Turning now to FIG. 9, illustrated therein is a variation of the method steps shown in FIG. 8. As before, at step 901, a central console unit 101 operates within a predefined area 102. One or more processors of the central console unit 101 detect, by exchanging data messages with a mobile device 110, the mobile device 110 exiting 603 the predefined area 102. Upon detecting the mobile device 110 exiting 603 the predefined area 102, the central console unit 101 causes the mobile device 110 to deliver an exchange data dossier 600 to the communication device of the central console unit 101.

In contrast to the method steps (801,802,803) of FIG. 8, which included a dump of data, in this embodiment the central console unit 101 delivers an interrogation communication 904 to the mobile device 110. The exchange data dossier 600 thus comprises a response communication to the interrogation communication 904.

The exchange data dossier 600 therefore provides an informed answer. Continuing the "mother" example from FIG. 8, rather than delivering a daily schedule for the mother, the exchange data dossier 600 in the embodiment of FIG. 9 delivers a response indicating the mother should return and re-enter the predefined area 102 at a specific time, which is 5:45 PM. Step 901 advantageously not only shifts the determination of the specific time from the central console unit 101 to the mobile device 110, thereby freeing resources in the central console unit 101, but it further prevents information such as her doctor's appointment or social media followers from being transmitted as superfluous information. In short, the central console unit 101 receives only the information it actually needs to inform other mobile devices or control various Internet-of-things devices at step 901.

At step 901, the one or more processors of the central console unit 101 extract 904 one or more data parameters 905 from the exchange data dossier 600. In one or more embodiments, the one or more data parameters 905 comprising the specific return time when the mobile device 110 is expected to re-enter the predefined area 102. Step 901 thus does not require the central console unit 101 predicting a return time when the mobile device 110 will re-enter the predefined area 102.

At step 902, the one or more processors of the central console unit 101 perform a control operation 805 altering a behavior of at least one Internet-of-things device 807,808,809. In one or more embodiments, this control operation 805 is performed at predetermined amount of time prior to the return time. In this example, the control operation 805 comprises turning on Internet-of-things device 807, causing Internet-of-things device 808 to play "Buster's Blues," and causing Internet-of-things device 809, which is a thermostat, to set the temperature to 72 degrees. Accordingly, when the mother comes home at 5:45 PM, the home is just the way she likes it.

In one or more embodiment, the central console unit 101 can respond to "abnormal triggers." "Abnormal triggers" are situations where a mobile device enters the predefined area 102 and the central console unit 101 delivers an exchange data dossier 600 to the mobile device indicating that one of the Internet-of-things devices detected an excessive level, e.g., a loud audio level or large vibrations, and abnormal behavior of the user, e.g., the user was loud, agitated, or running late. In such situations the central console unit 101 can share this information with mobile devices of other users to let them know dad may be really angry. Alternatively, the central console unit 101 can adjust Internet-of-thing devices if the abnormal level is due to an environmental condition such as temperature, humidity, sunlight, rain, and so forth.

At step 903, the central console unit 101 detects the mobile device 110 re-entering 810 the predefined area 102. In one or more embodiments, upon detecting the mobile device 110 re-entering 810 the predefined area 102, the central console unit 101 causes the mobile device 110 to deliver another exchange data dossier (811) the central console unit 101.

In this illustrative embodiment, the mobile device 110 delivers an interrogation communication 907 to the central console unit 101. In this example, the interrogation communication 907 inquires, "Who is home." The central console unit 101 knows this from the receipt of other exchange data dossiers, received from other mobile devices, as they entered the predefined area 102.

In response to this message, the central console unit 101 delivers an exchange data dossier 906 to the mobile device. This exchange data dossier 906 indicates that the owner of the mobile device 110, Buster, and Mac are all at home. This exchange data dossier 906 thus comprises an upload of data received from other exchange data dossiers received from other mobile in response to the interrogation communication 907.

Figure 10:
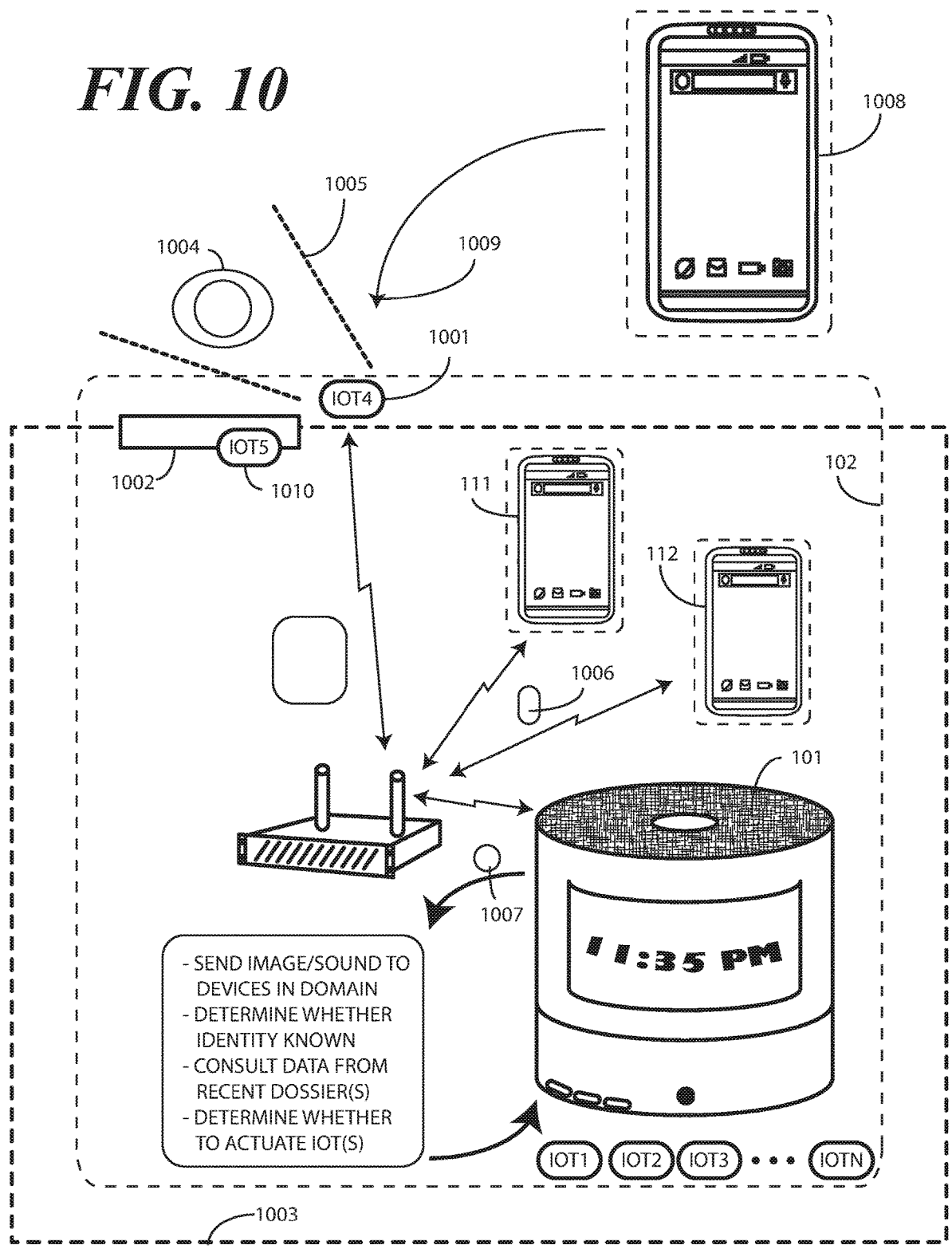
FIG. 10 illustrates one or more method steps in accordance with one or more embodiments of the disclosure.

Turning now to FIG. 10, in one or more embodiments the central console unit 101 can query mobile devices 111,112 operating within its predefined area 102 to obtain information. For example, when an unknown mobile device 1008 enters 1009 a predefined area 102, the central console unit 101 detects this unknown mobile device entering the predefined area 102. If an Internet-of-things camera 1001 is positioned at the front door 1002 of a home 1003, and a person 1004 approaches the door, the central console unit 101 can capture an image 1005 of the person 1004 and then deliver it in a query in the form of an interrogation communication 1006 to the various mobile devices 111,112 operating within the predefined area 102.

In one or more embodiments, the query comprises an interrogation communication 1006 or message comprising one or more of an image or an audio signal of the user of the unknown mobile device 1008. For example, an Internet-of-things speaker/microphone 1010 may ask the stranger 1004, "Who is it," and may record "Candy gram," from the stranger 1004. This audio could be included with the interrogation communication 1006 to help others identify the stranger. In this example, the interrogation communication 1006 can include the image 1005 of the person 1004 to help others identify the stranger.

The central console unit 101 can then transmit, with its communication device, an interrogation communication 1006 the various mobile devices 111,112 operating within the predefined area 102. In one or more embodiments, the interrogation communication 1006 can request an identity of another user of the at least one unknown mobile device. The query of the interrogation communication 1006 can also include an inquiry asking if any users of the mobile devices 111,112 can identify the person 1004 at the door 1002.

If someone can, then than information is delivered back to the central console unit 101 in an exchange data dossier 1007. For example, the central console unit 101 can receive, with its communication device, an exchange data dossier 1007. This exchange data dossier 1007 can include an identification of the stranger. It can also include a preference or an interest of the guest as well.

The information of the exchange data dossier 1007 can be returned in various ways. In one or more embodiments where, as in this example, at least a second mobile device is operating within the predefined area 102, the response found in the exchange data dossier 1007 can comprise one or more data parameters concerning a user of this second device. For instance, a user may say, "I know Buster. He's a friend."

However, in another embodiment an exchange data dossier 1007 may provide calendar information that the home 1003 within the predefined area 102 is scheduled for a pest control company to send a representative to the home 1003 at this time of day. The central console unit 101 can then determine that there is a high probability the person at the door is an exterminator from this received exchange data dossier 1007.

Figure 11:
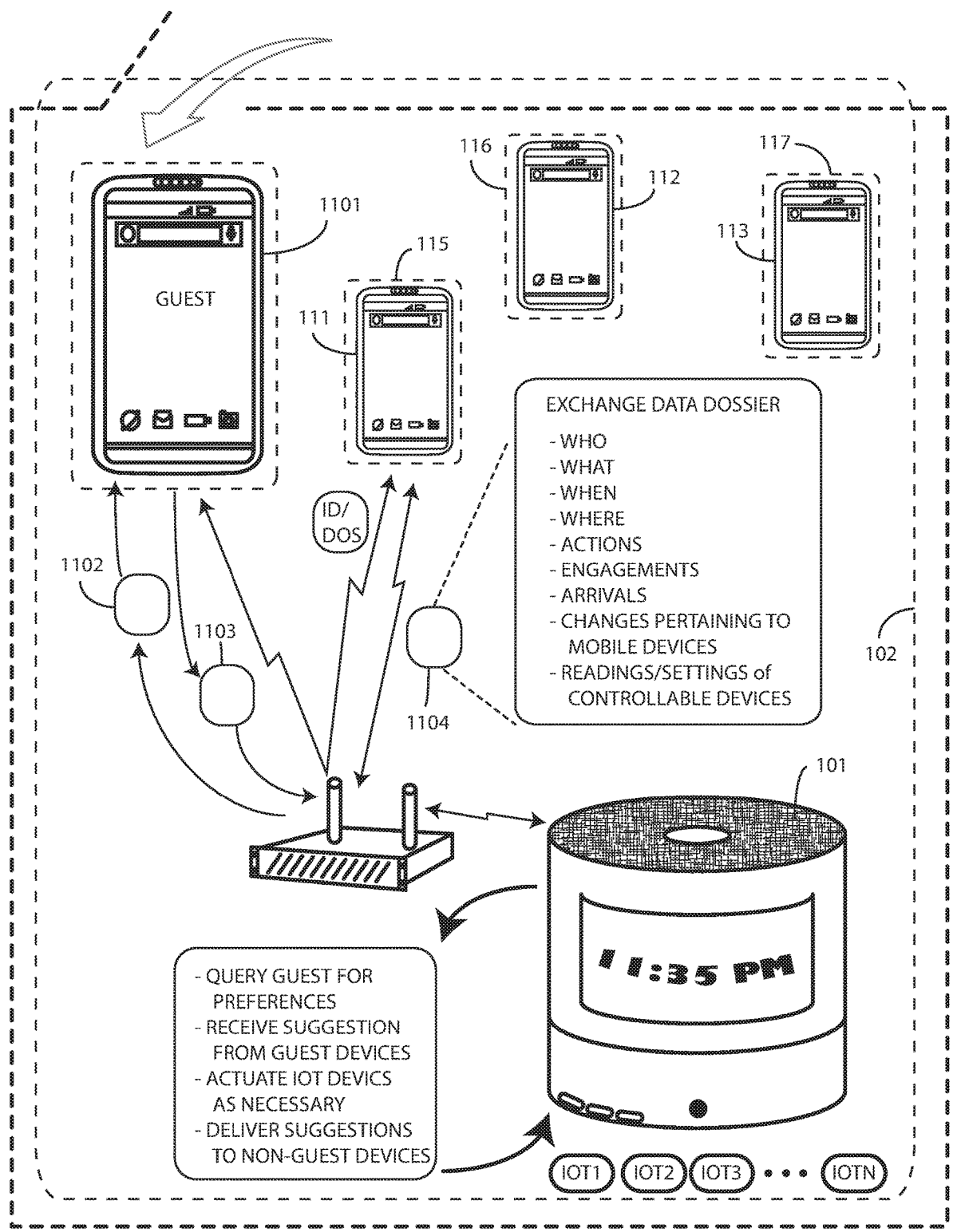
FIG. 11 illustrates one or more method steps in accordance with one or more embodiments of the disclosure.

Turning now to FIG. 11, the fact that the central console unit 101 manages information from occurrences in its predefined area 102, while the mobile devices 111,112,113 manage information from occurrences performed by the user, allows for a more efficient and effective use of information and resources throughout the corresponding system. For example, it can allow for a more proper concept of guests. When someone comes to visit, one of the mobile devices 111,112,113 operating within the predefined area 102 may be able to identify them and share details about the guest. In one or more embodiments, the mobile device 1101 belonging to the visitor can interact with the central console unit 101 as well, thereby augmenting its locally stored information as appropriate to the situation.

To illustrate this, consider the following example: Imagine a friend visiting his family. Now imagine that it is approaching the time to eat dinner. When this occurs, the central console unit 101 will detect the mobile device 1101 belonging to the friend. To get the best recommendations for dinner, in one or more embodiments the central console unit 101 queries, using an interrogation message 1102 the mobile device 1101 of the friend asking what type of food the friend prefers. Since the friend's mobile device 1101 understands what type of food—and restaurants—the friend likes as a function of past food orders, restaurant payments, etc., in one or more embodiment it will send an exchange data dossier 1103 indicating a suggested type of food or suggested restaurant. Since this is a streamlined query-exchange data dossier exchange, the mobile device 1101 of the friend does not simply dump a list of preferences. Instead, by considering additional information in a holistic approach, the mobile device 1101 belonging to the friend might send a specific restaurant recommendation as a function of the location, time of day, day of the week, etc.

This preference in restaurants can then be shared with the other mobile devices 111,112,113. For example, where a second or third mobile device is operating within the predefined area 102, the central console unit 101 can transmit, with its communication device, a second exchange data dossier 1104 to these mobile devices 111,112 upon their entry into the predefined area 102. Since this second exchange data dossier 1104 includes the restaurant preference, it comprises at least one of a preference or an interest of the user of mobile device 1101.

Figure 12:
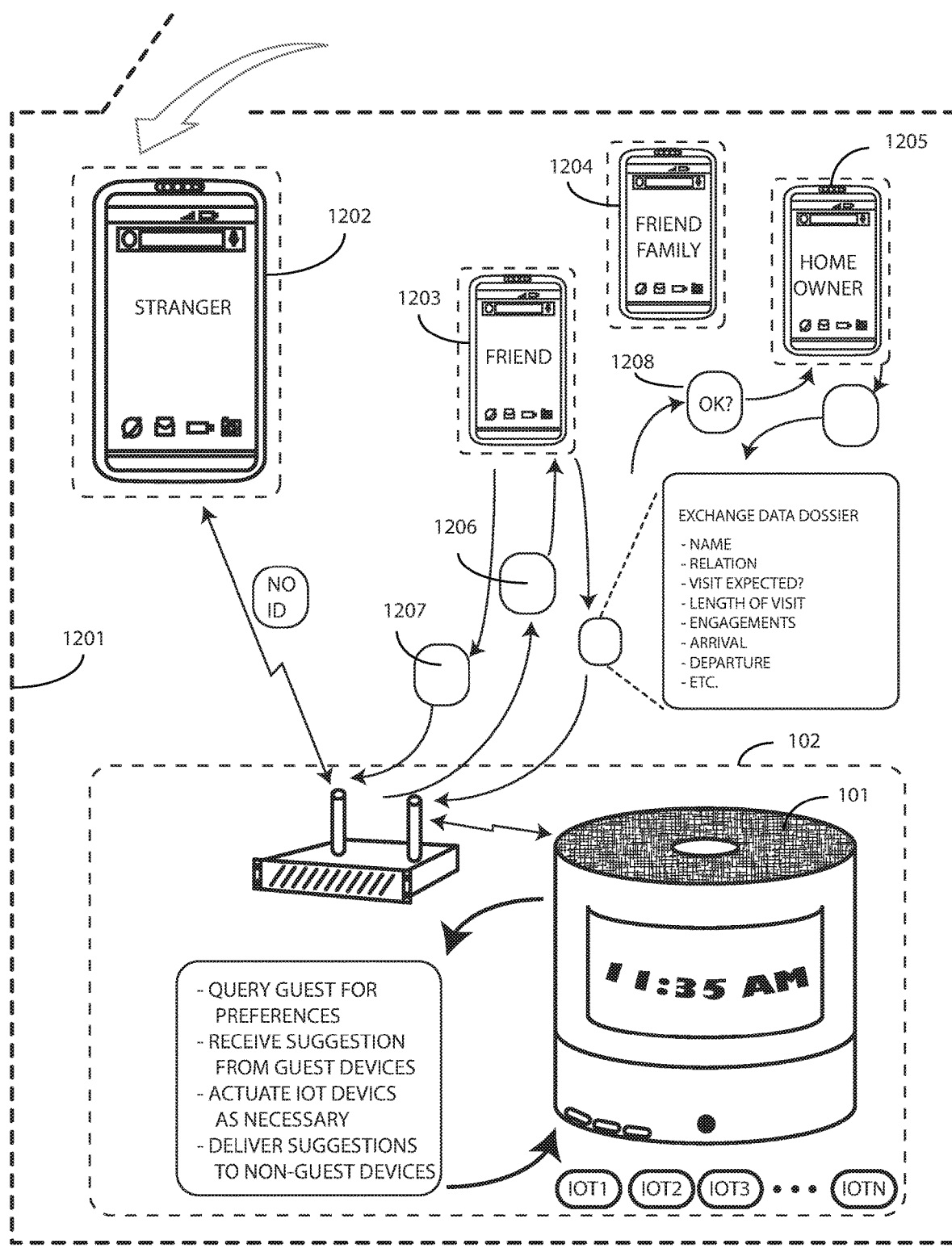
FIG. 12 illustrates one or more method steps in accordance with one or more embodiments of the disclosure.

Turning now to FIG. 12, consider the situation where a stranger with an unknown mobile device 1202 stops by to visit a home 1201 defining a predefined area 102 around a central console unit 101. Now imagine that a friend and his family, each having mobile devices 1203,1204,1205 are also visiting the home 1201. When the stranger comes, the central console unit 101 will not recognize their corresponding mobile device 1202.

As such, in one or more embodiments the central console unit 101 will send queries 1206 to other mobile devices 1203,1204,1205 operating within the predefined area 102 asking for the identity of the stranger. Since the central console unit 101 recognizes the mobile device 1203 belonging to friend, the central console unit 101 will also send the query 1206 to the friend's mobile device 1203 in one or more embodiments. If it turns out that the stranger is someone the friend knows, who just happened to hear the friend was in town and wanted to swing by and chat for five minutes, the mobile device 1203 of the friend will inform the central console unit 101 with this information in an exchange data dossier 1207.

The exchange data dossier 1207 may also include relevant information about the stranger such as name, relation, whether the visit was expected, and how long the visit is likely to take. The central console unit 101 at that point could send a query 1208 to the mobile device 1205 of the owner of the home 1201 inquiring as to whether it is okay to allow the stranger in. The query 1208 could be in the form of an exchange data dossier including the information received from the exchange data dossier 1207 from the mobile device 1203 of the friend. Since the exchange data dossiers are not mere data dumps, but are rather focused and specific information based upon data received from the various sensors and processors of the owner's mobile device 1205, instead of getting the notification, "There is some random stranger at your door . . . ," the owner would see something like "James is here to visit with your friend Dan. The visit was not anticipated but likely will be short."

Figure 13:
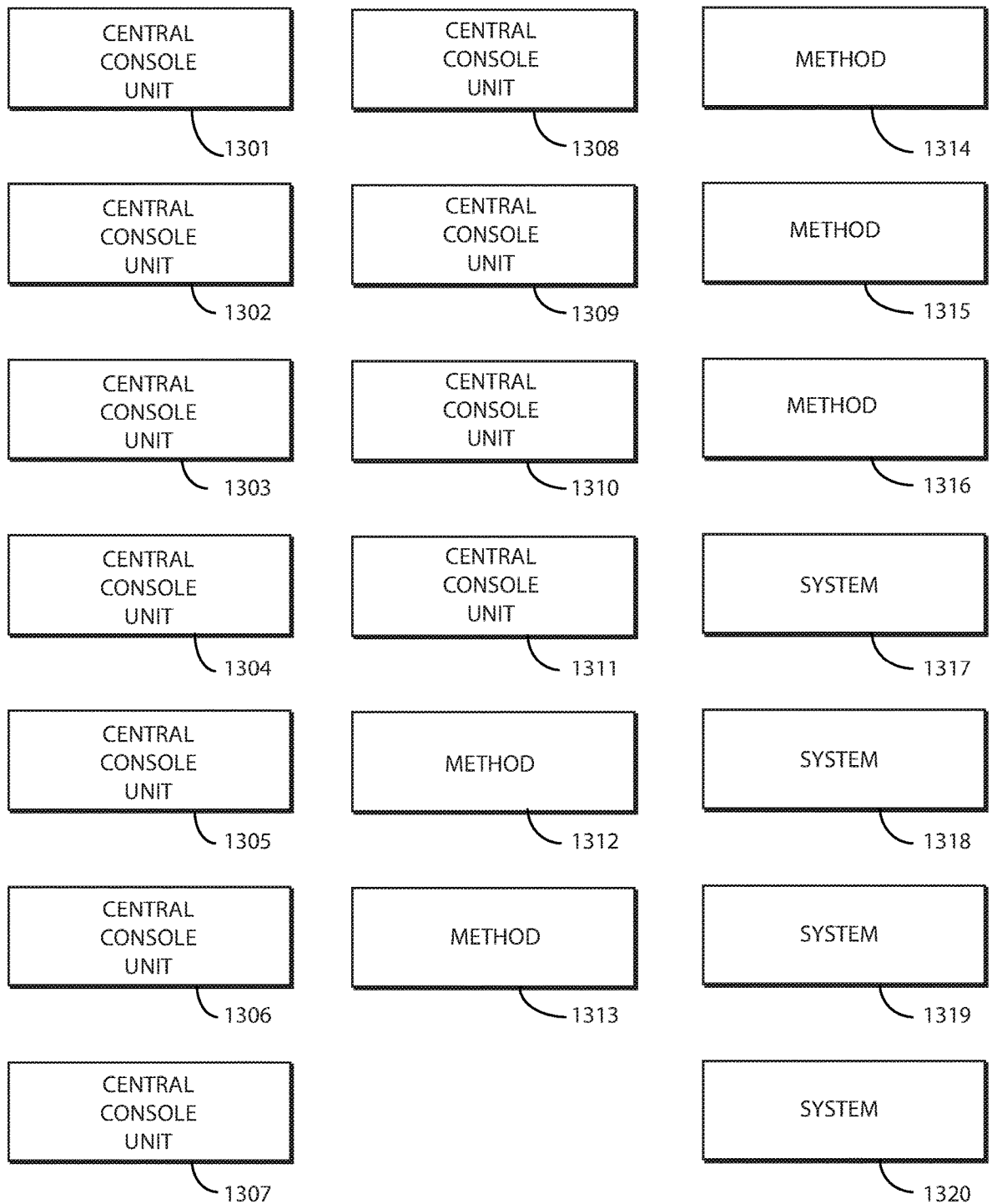
FIG. 13 illustrates one or more embodiments of the disclosure.

Turning now to FIG. 13, illustrated therein are various embodiments of the disclosure. At 1301, a central console unit comprises a communication device communicating with one or more Internet-of-things devices operating within a predefined area. At 1301, the central console unit includes one or more processors and operable with the communication device and a memory, At 1301, the central console unit includes an artificial intelligence engine operable with the one or more processors and the memory. At 1301, the artificial intelligence engine receives inputs and control settings from the one or more Internet-of-things devices. At 1301, the artificial intelligence engine transforms the inputs and control settings into machine learned knowledge in an Internet-of-things knowledge domain stored in the memory.

At 1301, the the one or more processors detect, with the communication device, at least one mobile device having other machine learned knowledge about an authorized user of the mobile device in a user knowledge domain stored in the at least one mobile device being kept separate from the Internet-of-things knowledge domain of the central console unit. At 1301, and upon detecting the at least one mobile device communicating with the communication device, the one or more processors cause the communication device to cause the at least one mobile device to deliver an exchange data dossier to the communication device.

At 1302, the one or more processors of 1301 further perform a control operation altering a behavior of at least one Internet-of-things device in response to the communication device receiving the exchange data dossier. At 1303, the one or more processors of 1301 further extract one or more data parameters from the exchange data dossier. At 1303, the one or more processors further perform a control operation altering a behavior of at least one Internet-of-things device as a function of one or more data parameters.

At 1304, the one or more processors of 1301 further cause the communication device to deliver an interrogation communication to the at least one mobile device in response to detecting the at least one mobile device communicating with the communication device. At 1304, the exchange data dossier comprises a response communication to the interrogation communication.

At 1305, the one or more processors of 1301 extract one or more data parameters from the exchange data dossier. At 1305, the one or more data parameters comprise at least one of an interest or a preference of at least one user of the at least one mobile device.

At 1306, the one or more processors of 1301 extract one or more data parameters from the exchange data dossier. At 1301, the one or more data parameters comprise at least one Internet-of-things device setting for at least one Internet-of-things device selected from the one or more Internet-of-things devices.

At 1307, the central console unit of 1301 further comprises a memory operable with the one or more processors. At 1307, the one or more processors maintain a user preference log comprising data parameters extracted from prior exchange data dossiers received from the at least one mobile device. At 1307, the one or more processors further update the user preference log with one or more data parameters extracted from the exchange data dossier.

At 1308, the one or more processors from 1301 extract one or more data parameters from the exchange data dossier. At 1308, the one or more data parameters comprising a return time when the at least one mobile device re-enters a predefined area surrounding the central console unit. At 1308, the one or more processors perform a control operation altering a behavior of at least one Internet-of-things device at predetermined amount of time prior to the return time.

At 1309, at least a second mobile device is operating within a predefined area surrounding the central console unit of 1301. At 1309, the one or more processors further cause the communication device to deliver a second exchange data dossier to the at least one mobile device upon the entering or exiting the predefined area surrounding the central console unit. At 1039, the second exchange data dossier comprises one or more data parameters concerning a user of the at least a second device.

At 1310, the communication device of 1301 receives an interrogation communication from the at least one mobile device in response to the at least one mobile device. At 1310, the one or more processors further cause the communication device to deliver a response communication to the interrogation communication to the at least one mobile device. At 1311, where at least a second mobile device is operating within a predefined area surrounding the central console unit of of 1310, the response comprises one or more data parameters concerning a user of the at least a second device.

At 1312, a method comprises detecting, with a communication device of a central console unit, at least one mobile device having stored therein machine-learned knowledge about an authorized user in a user knowledge domain communicating with the communication device. At 1312, the method includes causing, by one or more processors operable with the communication device, the at least one mobile device to deliver an exchange data dossier to the communication device. At 1312, the exchange data dossier comprises at least one of a preference of an interest of at least one user of the at least one mobile device selected from the user knowledge domain stored in the at least one mobile device.

At 1312, the method includes extracting, by the one or more processors, the at least one of the preference or the interest of the at least one user of the at least one mobile device. At 1312, the method includes altering an operating state of one or more Internet-of-things devices operating within, and communicating on, the predefined area as a function of the at least one of the preference or the interest of the at least one user of the at least one mobile device.

At 1313, at least a second mobile device is communicating with the communication device of 1312. At 1313, the method comprises transmitting, by the communication device, a second exchange data dossier to the at least one mobile device upon the at least one mobile device entering the predefined area. At 1313, the second exchange data dossier comprises at least one of another preference or another interest of at least another user of the second mobile device.

At 1314, the method of 1312 further comprises also detecting at least one unknown mobile device communicating with the communication device. At 1314, the method comprises transmitting, with the communication device, an interrogation communication to the at least one mobile device. At 1314, the interrogation communication requests an identity of another user of the at least one unknown mobile device.

At 1315, the method of 1314 further comprises receiving, with the communication device, another exchange data dossier from the at least one mobile device. At 1315, the other exchange data dossier comprises at least one of another preference or another interest of the other user of the at least one unknown mobile device.

At 1316, the method of 1312 further comprises predicting, by the one or more processors, a return time when the at least one mobile device re-enters a predefined area about the communication device from one or more parameters of the exchange data dossier. At 1316, the altering occurs at predetermined amount of time prior to the return time.

At 1317, a system comprises a cloud server comprising a communication device, one or more processors, and an artificial intelligence engine. At 1317, the communication device is in communication with a communication hub communicating with one or more Internet-of-things. At 1317, the artificial intelligence engine receives inputs from the one or more Internet-of-things devices and transforms the inputs and control settings into machine learned knowledge stored in an Internet-of-things knowledge domain of the cloud server/

At 1317, one or more processors of the cloud server detect, with the communication device, at least one mobile device communicating with the communication device. At 1317, the at least one mobile device hays other machine learned knowledge about an authorized user of the mobile device in a user knowledge domain stored in the at least one mobile device. At 1317, the user knowledge domain is separate from the Internet-of-things knowledge domain.

At 1317, and upon detecting the at least one mobile device communicating with the communication device, the one or more processors receive an exchange data dossier from the at least one mobile device at the communication device. At 1317, the one or more processors alter an operating state of one or more Internet-of-things devices operating within, and communicating on, the predefined area as a function of one or more parameters extracted from the exchange data dossier.

At 1318, the one or more processors of 1317 further detect an unknown mobile device communicating with the communication device. At 1318, the one or more processors cause the communication device to transmit an interrogation message to the at least one mobile device requesting an identity of a user of the unknown mobile device. At 1318, the interrogation message of 1318 comprises one or more of an image or an audio signal of the user of the unknown mobile device.

At 1320, the one or more processors of 1317 detect, with the communication device, at least one other mobile device communicating with the communication device. At 1320, the one or more processors receive, at the communication device, another exchange data dossier from the at least one other mobile device. At 1320, the one or more processors transmit data parameters extracted from the other exchange data dossier to the at least one mobile device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example the central console unit can gather learned information from other AI devices to collaboratively learn in a home setting or make updates with other devices learning appropriately based on the newly acquired/updated console knowledge. In one or more embodiments, these updates would be different for a parent verses a teenager for traffic (what routes to school or work), weather (what to wear for train rider verses driver), news (what programming is available on television), environment (what lightning configurations to set), situations (when a vehicle is due for maintenance), commerce (what's on sale), or inventory (who has the best availability to fill the grocery list).

In one or more embodiments, the central console unit can distribute learning/training tasks amongst multiple devices as it sees fit, or alternatively when any of mobile devices are available and/or idle. Said differently, each device can transfer its exchange data dossier during the day, with the central console unit distribute the extracted information to other devices for processing/training/updating during the evening. This process can be anonymized so that the mobile devices can process information on non-user devices while keeping the information private. For instance, what one device learned about traffic or parking patterns because of new construction can be processed on all of the devices more quickly during dinner so they'll be ready more quickly.

In one or more embodiments, the central console unit can optimize home data throughput and latency by checking and deciding on the best connectivity path for all of the mobile devices in the home. For instance, if the cable infrastructure is running slow and a mobile device has better connectivity and throughput using a wireless connection, the central console unit can route all traffic through there until the wired infrastructure has better throughput and latency.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A central console unit, comprising:
a communication device communicating with one or more Internet-of-things devices;
one or more processors operable with the communication device;
a memory; and
an artificial intelligence engine operable with the one or more processors and the memory, the artificial intelligence engine receiving inputs and the control settings from the one or more Internet-of-things devices and transforming the inputs and control settings into machine learned knowledge in an Internet-of-things knowledge domain stored in the memory;
the one or more processors detecting, with the communication device, at least one mobile device having stored therein other machine learned knowledge about an authorized user in a user knowledge domain stored in the at least one mobile device, the user knowledge domain being separate from the Internet-of-things knowledge domain communicating with the communication device; and
upon detecting the at least one mobile device communicating with the communication device, the one or more processors causing the communication device to cause the at least one mobile device to deliver an exchange data dossier comprising information selected from the user knowledge domain.

2. The central console unit of claim 1, the one or more processors further performing a control operation altering a behavior of at least one Internet-of-things device in response to the communication device receiving the exchange data dossier.

3. The central console unit of claim 1, the one or more processors further:
extracting one or more data parameters from the exchange data dossier; and
performing a control operation altering a behavior of at least one Internet-of-things device as a function of one or more data parameters.

4. The central console unit of claim 1, the one or more processors further causing the communication device to deliver an interrogation communication to the at least one mobile device in response to detecting the at least one mobile device communicating with the communication device, the exchange data dossier comprising a response communication to the interrogation communication.

5. The central console unit of claim 1, the one or more processors extracting one or more data parameters from the exchange data dossier, the one or more data parameters comprising at least one of an interest or a preference of at least one user of the at least one mobile device.

6. The central console unit of claim 1, the one or more processors extracting one or more data parameters from the exchange data dossier, the one or more data parameters comprising at least one Internet-of-things device setting for at least one Internet-of-things device selected from the one or more Internet-of-things devices.

7. The central console unit of claim 1, the one or more processors maintaining a user preference log comprising data parameters extracted from prior exchange data dossiers received from the at least one mobile device, the one or more processors further updating the user preference log with one or more data parameters extracted from the exchange data dossier.

8. The central console unit of claim 1, the one or more processors extracting one or more data parameters from the exchange data dossier, the one or more data parameters comprising a return time when the at least one mobile device re-enters a predefined area surrounding the central console unit, the one or more processors performing a control operation altering a behavior of at least one Internet-of-things device at predetermined amount of time prior to the return time.

9. The central console unit of claim 1, wherein at least a second mobile device is operating within a predefined area surrounding the central console unit, the one or more processors further causing the communication device to deliver a second exchange data dossier to the at least one mobile device upon the entering or exiting the predefined area surrounding the central console unit, the second exchange data dossier comprising one or more data parameters concerning a user of the at least a second device.

10. The central console unit of claim 1, the communication device receiving an interrogation communication from the at least one mobile device, the one or more processors further causing the communication device to deliver a response communication to the interrogation communication to the at least one mobile device.

11. The central console unit of claim 10, wherein at least a second mobile device is operating within a predefined area surrounding the central console unit, the response comprising one or more data parameters concerning a user of the at least a second device.

12. A method, comprising:
detecting, with a communication device of a central console unit, at least one mobile device having stored therein machine learned knowledge about an authorized user in a user knowledge domain communicating with the communication device;
causing, by one or more processors operable with the communication device, the at least one mobile device to deliver an exchange data dossier to the communication device, the exchange data dossier comprising at least one of a preference of an interest of at least one user of the at least one mobile device selected from the user knowledge domain stored in the at least one mobile device;
extracting, by the one or more processors, the at least one of the preference or the interest of the at least one user of the at least one mobile device; and
altering an operating state of one or more Internet-of-things devices communicating with the communication device as a function of the at least one of the preference or the interest of the at least one user of the at least one mobile device.

13. The method of claim 12, wherein at least a second mobile device is communicating with the communication device, further comprising transmitting, by the communication device, a second exchange data dossier to the at least one mobile device, the second exchange data dossier comprising at least one of another preference or another interest of at least another user of the second mobile device.

14. The method of claim 12, further comprising also detecting at least one unknown mobile device communicating with the communication device and transmitting, with the communication device, an interrogation communication to the at least one mobile device, the interrogation communication requesting an identity of another user of the at least one unknown mobile device.

15. The method of claim 14, further comprising receiving, with the communication device, another exchange data dossier from the at least one mobile device, the another exchange data dossier comprising at least one of another preference or another interest of the another user of the at least one unknown mobile device.

16. The method of claim 12, further comprising predicting, by the one or more processors, a return time when the at least one mobile device re-enters a predefined area about the communication device from one or more parameters of the exchange data dossier, wherein the altering occurs at predetermined amount of time prior to the return time.

17. A system, comprising:
a cloud server comprising a communication device, one or more processors, and an artificial intelligence engine, the communication device in communication with a communication hub in communication with one or more Internet-of-things devices, the artificial intelligence engine receiving inputs from the one or more Internet-of-things devices and transforming the inputs into machine learned knowledge stored in an Internet-of-things knowledge domain of the cloud server;
the one or more processors detecting, with the communication device, at least one mobile device communicating with the communication device, the at least one mobile device having other machine learned knowledge about an authorized user of the mobile device in a user knowledge domain stored in the at least one mobile device, the user knowledge domain being separate from the Internet-of-things knowledge domain; and
upon detecting the at least one mobile device communicating with the communication device, the one or more processors receiving an exchange data dossier from the at least one mobile device at the communication device; and
the one or more processors altering an operating state of one or more Internet-of-things devices communicating with the communication device as a function of one or more parameters extracted from the exchange data dossier.

18. The system of claim 17, the one or more processors further detecting an unknown mobile device communicating with the communication device and causing the communication device to transmit an interrogation message to the at least one mobile device requesting an identity of a user of the unknown mobile device.

19. The system of claim 18, the interrogation message comprising one or more of an image or an audio signal of the user of the unknown mobile device.

20. The system of claim 17, the one or more processors detecting, with the communication device, at least one other mobile device communicating with the communication device, receiving, at the communication device, another exchange data dossier from the at least one other mobile device, and transmitting data parameters extracted from the another exchange data dossier to the at least one mobile device.

* * * * *